US006625140B1

United States Patent
Kamimura

(10) Patent No.: US 6,625,140 B1
(45) Date of Patent: Sep. 23, 2003

(54) COMMUNICATION TERMINAL, REPEATER, PERIPHERAL EQUIPMENT AND COMPUTER READABLE MEMORY MEDIUM

(75) Inventor: Toru Kamimura, Shiga (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/317,433

(22) Filed: May 24, 1999

(30) Foreign Application Priority Data

May 25, 1998 (JP) .......................................... 10-142994
Mar. 9, 1999 (JP) .......................................... 11-061426

(51) Int. Cl.[7] ............................................. H04L 12/66
(52) U.S. Cl. .................. 370/352; 379/202.01; 709/204; 709/227
(58) Field of Search ................................ 370/260, 274, 370/352, 356; 379/201.1, 201.11, 202.01, 433.01, 428.03, 420.04, 419; 709/227, 228, 204, 205

(56) References Cited

U.S. PATENT DOCUMENTS

| | | | | | |
|---|---|---|---|---|---|
| 5,850,433 A | * | 12/1998 | Rondeau | ................. | 379/218.01 |
| 5,854,893 A | * | 12/1998 | Ludwig et al. | .............. | 709/204 |
| 5,884,039 A | * | 3/1999 | Ludwig et al. | .............. | 709/227 |
| 5,936,679 A | * | 8/1999 | Kasahara et al. | ............ | 348/553 |
| 6,009,469 A | * | 12/1999 | Mattaway et al. | ........... | 709/227 |
| 6,038,602 A | * | 3/2000 | Ishikawa | ..................... | 709/227 |
| 6,144,667 A | * | 11/2000 | Doshi et al. | ................. | 370/401 |
| 6,243,398 B1 | * | 6/2001 | Kahane et al. | ............... | 370/522 |
| 6,262,978 B1 | * | 7/2001 | Bruno et al. | ................. | 370/260 |
| 6,310,873 B1 | * | 10/2001 | Rainis et al. | ............... | 370/356 |
| 6,323,894 B1 | * | 11/2001 | Katz | ........................ | 379/93.12 |
| 6,324,264 B1 | * | 11/2001 | Wiener et al. | ............... | 370/352 |
| 6,332,153 B1 | * | 12/2001 | Cohen | ......................... | 709/204 |
| 6,343,115 B1 | * | 1/2002 | Foladare et al. | ............. | 370/352 |
| 6,377,568 B1 | * | 4/2002 | Kelly | .......................... | 370/352 |
| 6,396,510 B1 | * | 5/2002 | Pendse et al. | ............... | 345/739 |

* cited by examiner

Primary Examiner—Hassan Kizou
Assistant Examiner—Ahn-Vu H Ly
(74) Attorney, Agent, or Firm—Armstrong, Westerman & Hattori LLP

(57) ABSTRACT

A communication terminal includes a CPU and a work memory to hold an identifier. When a connection is established to a repeater, the CPU outputs a connection establishing request, together with communication terminal information including its own identifier, to the repeater. If a connection between the communication terminal and the repeater is established, the repeater similarly transmits communication terminal information on another communication terminal established in connection state to the repeater, to this communication terminal. The CPU searches for particular communication terminal information having common identification information to its own from those of received communication terminal information. If particular communication terminal information is found, the CPU displays a character corresponding to its own identifier on a display.

33 Claims, 24 Drawing Sheets

FIG. 7

| CATEGORY CODE 1 | CATEGORY CODE 2 | CATEGORY CODE 3 |
|---|---|---|
| ANIMATION | K SERIES | LITTLE T |
| | | MR. M |
| | | ⋮ |
| | PM LAND | DOG |
| | | RIVER HORSE |
| | | ⋮ |
| | ⋮ | |
| HORROR | SKULL | |
| | VAMPIRE | |
| | MECHANICAL MAN | |
| | ⋮ | |

MOTION-
PICTURE
FRAME

FIG. 29

| CATEGORY CODE 1 | CATEGORY CODE 2 | CATEGORY CODE 3 |
|---|---|---|
| COMPETITION GAME | SUMO | LOWEST COLUMN |
| | | SECOND LOWEST COLUMN |
| | | ⋮ |
| | | GRAND CHAMPION |
| | JUDO | LOCAL MEET |
| | | NATIONAL MEET |
| | | ⋮ |
| | | OLYMPIC |
| | SHOGI | BEGINNER |
| | | ⋮ |
| | | MASTER |
| | ⋮ | |
| UNRIDDING GAME | WHO IS PERPETRATOR | LEVEL 1 |
| | | ⋮ |
| | | LEVEL 10 |
| | | |

COMMUNICATION TERMINAL, REPEATER, PERIPHERAL EQUIPMENT AND COMPUTER READABLE MEMORY MEDIUM

BACKGROUND OF THE INVENTION

1. Field of the Invention

This invention relates to communication terminals, and more particularly to a communication terminal that is applicable for communication to be made through a network.

2. Description of the Prior Art

There is known an Internet Phone offered by VocalTec Communications Ltd. which is software to enable telephonic communication through utilizing the Internet. If a communication terminal having such software installed thereon, is connected to the Internet, and then this software is started Lip on the Internet, the comminucation terminal is put into connection to a call center (repeater). In this state, if a global on-line directory is clicked, a list is displayed including other communication terminals now currently connected to the call center. If a desired communication terminal is opted from this list, its own communication terminal is brought into connection to that desired communication terminal via the call center. With the Internet Phone, it is possible to make telephonic communication with an opposite of communication in the above manner.

However, the global on-line directory has an entry including all the communication terminals currently connected to the call center. As a consequence, there existed difficulty in searching for a particular terminal from among those of the director.

SUMMARY OF THE INVENTION

Therefore, it is a primary object of the present invention to provide a communication terminal which is capable of easily searching for a particular communication terminal.

It is another object of the present invention to provide a repeater which can cooperate with such a communication terminal.

It is further object of the present invention to provide another communication terminal which can cooperate with such a communication terminal.

It is still another object of the present invention to provide peripheral equipment which can cooperate with such communication terminal.

It is another object of the present invention to provide a computer-readable recording medium with which a particular opposing communication terminal can be easily searched for.

According to the present invention, a communication terminal for implementing communication through a repeater comprises: a memory holding an identifier; an establishing means for establishing a state of connection to the repeater; a first receiving means for receiving from the repeater an identifier to another communication terminal connected to the repeater; a search means for searching for a particular identifier associated with the identifier held in the memory from among a plurality to identifiers received by the receiving means; and a display means for displaying a predetermined character depending upon a result of search by the search means.

If a state of connection to the repeater is established, an identifier of another communication terminal connected to the repeater is received from the repeater by the first receiving means. The search means searches for a particular identifier associated with the identifier held in the memory from among a plurality of identifiers received by the first receiving means. The display means displays a predetermined character depending on a result of search by the search means.

In this manner, because the search means searches for a particular identifier from a plurality of identifiers and the display means displays a predetermined character depending on a result of search by the search means, it is possible to easily find a particular person at the other side of communications.

In one aspect of the present invention, the establishing means transmits a request to establish the connection state together with the identifier held in the memory to the repeater.

In another aspect of the present invention, if an accepting means accepts a communication start instruction, a request means requests to the repeater to start a communication with a particular communication terminal corresponding to the particular identifier in response to the communication start instruction, and a communication processing means performs communication processing with the particular communication terminal. Incidentally, the communication start instruction is input by selecting a character.

In one embodiment of the present invention, if a second receiving means receives a new identifier transmitted from the particular communication terminal, a write means writes the new identifier to the memory. This causes the current identifier held in the memory to be updated by the new identifier. Incidentally, the character to be displayed by the display possesses a shape corresponding to the identifier held in memory.

According to the present invention a repeater for repeating communication between a plurality of communication terminal, comprises: an establishing means for establishing state of connection with a communication terminal; a memory for holding an identifier of a communication terminal established in the connection state; a transmitting means for transmitting an identifier of a communication terminal being in a standby state to the communication terminal established in the connection state; and a relay processing means for performing relay processing with a desired communication terminal in response to a communication start request from the communication terminal established in the connection state.

If a state of connection to a communication terminal is established an identifier for this communication terminal is held in the memory. The transmitting means transmits an identifier for a communication terminal being in a standby state to the communication terminal thus established in connection state. The relay processing means makes relay processing for a desired communication terminal in response to a communication start request from the communication terminal established in the connection state. Incidentally, the standby state is a state that a connection state is established but not in communication.

According to the present invention, a communication terminal for implementing communication through a repeater, comprises: a memory for holding an identifier;
an establishing means for transmitting the identifier to the repeater and establishing a state of connection to the repeater; a receiving means for receiving through the repeater a Communication start request transmitted from another communication terminal; a communication processing means for performing communication processing with the other communication terminal in response to the communication start request: and a transmitting means for transmitting a new identifier different from the identifier to the other communication terminal when a predetermined relation is established to the other communication terminal.

If the establishing means transmits an identifier to the repeater to establish a state of connection to the repeater and the receiving means receives through the repeater a communication start request transmitted from another communication terminal, the communication processing means performs communication processing with the other communication terminal. If a predetermined relation is established to the other communication terminal, the transmitting means transmits a new identifier different from the identifier held in the memory to the other communication terminal.

In one embodiment of the present invention, the identifier includes at least torso category codes, one of the category codes representing a category that includes the category represented by the other category code. Further, the identifier held in the memory is different from the new identifier at least in the category code representative of a minimal or subset category.

According to the present invention, a computer readable recording medium for recording a program to be executed by a communication terminal for implementing communication through a repeater, the program comprising: an establishing step for establishing a state of connection to the repeater; a first receiving step for receiving from the repeater an identifier of another communication terminal connected to the repeater: a search step for searching for a particular identifier associated with the identifier held in the memory from among a plurality of identifiers received by the first receiving step; and a display step for displaying a predetermined character depending upon a result of search by the search step.

If in the establishing step a connection to the repeater is established, then the first receiving step makes reception from the repeater of an identifier for another communication terminal connected to the repeater. The search step searches for a particular identifier associated with the identifier held in the memory from among a plurality of identifiers received by the first receiving step. In the display step a predetermined character is displayed depending on a result of search by the search step.

In this manner because the search step searches for a particular identifier from a plurality of identifiers and the display step displays a predetermined character depending on a result of search by the search means, it is possible to easily find a particular person at the opposite side of communication.

In a certain embodiment of the present invention, the establishing step transmits to the repeater a request to establish the connection state together with the identifier held in the memory.

In one embodiment of the present invention, if an accepting step accepts a communication start instruction, a request step requests to the repeater to start communication with a particular communication terminal corresponding to the particular identifier in response to the communication start instruction. Also, a communication processing step performs communication processing with the particular communication terminal. Further, if a second receiving step receives a new identifier transmitted from the particular communication terminal, a write step writes the new identifier to memory. That is, the write step updates the identifier held in the memory by the new identifier.

According to the present invention, a communication terminal for implementing communication through a repeater, comprises: a memory for holding an identifier; an establishing means for establishing a state of connection to the repeater; a first transmitting means for transmitting to the repeater the identifier held in the memory; a first receiving means for receiving from the repeater a particular identifier associated with the identifier held in the memory; and a display means for displaying a predetermined character when an the particular identifier is received.

If the establishing means establishes a state of connection to the repeater, the first transmitting means transmits the identifier held in the memory to the repeater. If the first receiving means receives from the repeater a particular identifier associated with the identifier held in memory, the display means displays a predetermined character on the display.

In one aspect of the present invention an accepting, means accepts a communication start instruction, a request means requests to the repeater to start communication with a particular communication terminal having the particular identifier in response to the communication start instruction. A communication processing means performs communication processing with the particular communication terminal. Incidentally, the communication start instruction is meant to select the predetermined character.

In one embodiment of the present invention, if a second receiving means receives a new identifier transmitted from the particular communication terminal a write means writes the identifier to the memory. The write means updates the identifier held in the memory by the new identifier.

According to the present invention, a repeater for repeating communication, comprises: an establishing means for establishing a state of connection to a communication terminal; a memory for holding an identifier of a communication terminal established in connection state, a detecting means for detecting a particular identifier associated with an identifier to be noticed from among a plurality of identifiers held in the memory; a transmitting means for transmitting the particular identifier to a communication terminal having the identifier to be noticed; and a repeater processing means for relay processing with a particular communication terminal having the particular identifier in response to a communication start request from the communication terminal having the identifier to be identified.

If the establishing means establishes a state of connection to a communication terminal, an identifier for the communication terminal established in this connection state is stored in memory. The detecting means detects a particular identifier associated within an identifier to be noticed from among a plurality of identifiers held in the memory. The transmitting means transmits a detected particular identifier to a communication terminal having the identifier to be noticed. If a communication start request is given from the communication terminal having the identifier to be noticed, the relay processing means performs relay processing with the particular communication terminal having the particular identifier.

In one embodiment of the present invention, the detecting means detects the particular identifier from among identifiers for communication terminals which are established in the connection state but out of communication.

According to the present invention, a computer-readable recording medium for recording a program to be executed by a communication terminal to implement communication through a repeater, the program comprises: an establishing step for establishing a state of connection to the repeater; a first transmitting step for transmitting an identifier held in a memory to the repeater; a first receiving step for receiving from the repeater a particular identifier associated with the identifier held in the memory; and a display step for displaying a predetermined character when the particular identifier is received.

If a state of connection to the repeater is established by the establishing step, the first step transmits the identifier held in the memory to the repeater. If the first receiving step receives a particular identifier from the repeater, the display step displays a predetermined character.

In a certain aspect of the present invention, when an accepting step accepts a communication start instruction, a request step requests the repeater to start communication with a particular communication terminal having the particular identifier in response to the communication start instruction. A communication processing step performs communication processing with the particular communication terminal.

If a new identifier is transmitted from the particular communication terminal, this identifier is received by the second receiving step and written to the memory by the write step. In the write step, the current identifier held in the memory is updated by the new identifier.

According to the present invention, a peripheral equipment to be used together with a communication terminal for implementing communication through a repeater, comprises: a memory for holding an identifier associated with a particular communication terminal; an input means for inputting information; and an interface for providing the identifier and the information to the communication terminal.

The identifier associated with the particular communication terminal is held by the memory, and the information is inputted by the input means. The identifier and information are supplied to the communication terminal through the interface.

In one embodiment of the present invention, the input means inputs sound information and/or image information.

In one aspect of the present invention, if an intake means intakes a cartridge recorded with an identifier, a read means reads out the identifier recorded on the cartridge. An update means updates the identifier held in memory by the identifier read out by the read means.

Further, a write means writes the identifier held in the memory to the cartridge. Here, the write means updates the identifier recorded on the cartridge by the identifier held in the memory.

The above described objects and other objects, features, aspects and advantages of the present invention will become more apparent from the following detailed description of the present invention when taken in conjunction with the accompanying, drawings.

BRIEF DESCRIPTION OF THE DRAWINGS

FIG. 7 is a table showing category codes included in identification information;

FIG. 29 is a table showing identification information applied in the case using the peripheral equipment shown in FIG. 28.

DETAILED DESCRIPTION OF THE PREFERRED EMBODIMENTS

Figure 1:
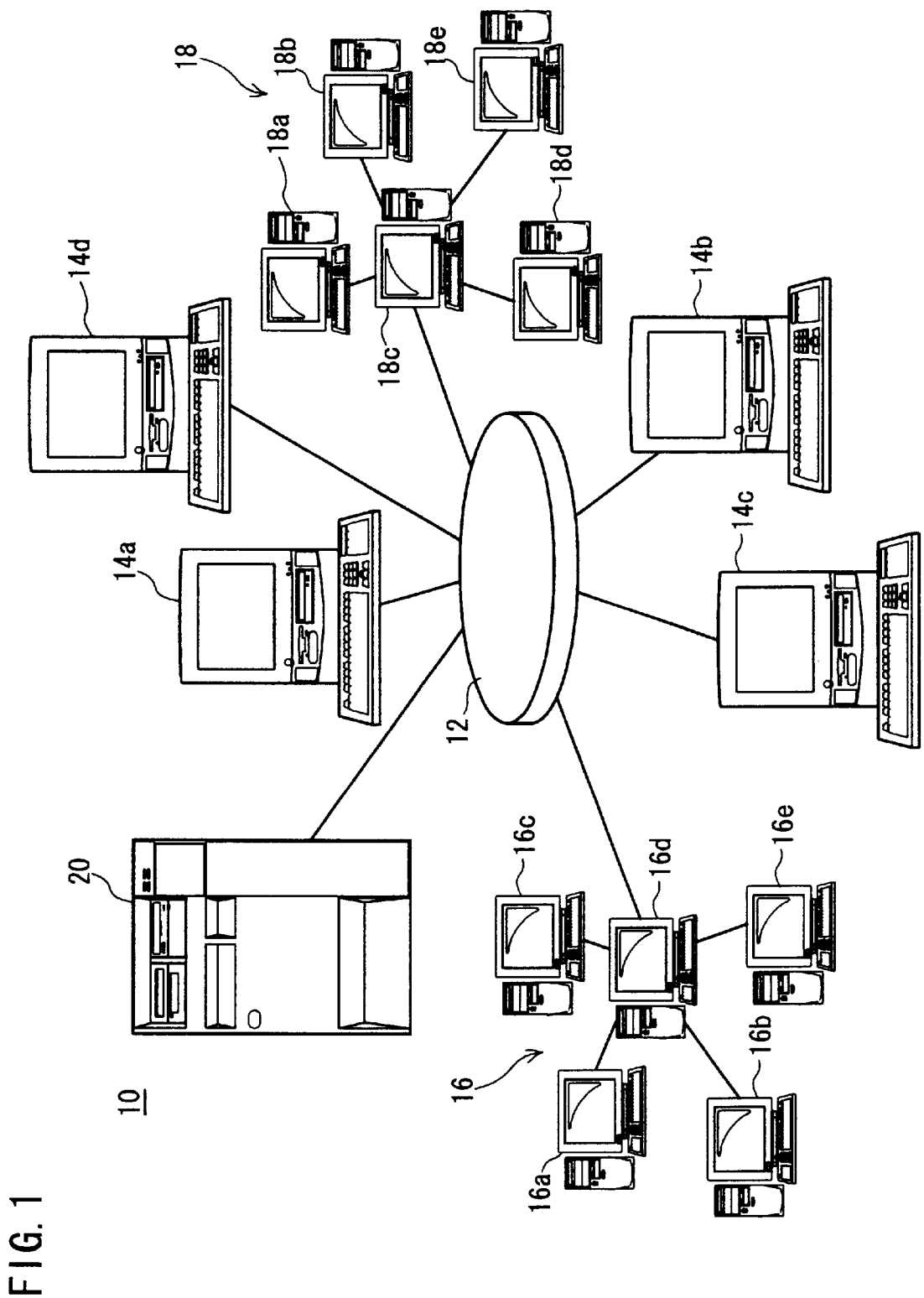
FIG. 1 is an illustrative view showing one embodiment of the present invention.

Referring to FIG. 1, a communication service system 10 in this embodiment includes a plurality of user-end communication terminals 14a–14d and a plurality of host-end communication terminals 16a–16e and 18a–18e which are connected to one another via the Internet 12. Among them, the host-end communication terminals 16a–16e belong to a common parent site 16, and the host-end communication terminals 18a–18e also to a common parent site 18. The user-end communication terminal, upon any of calling or being called, communicates with another of the user-end communication terminals, and by calling, communicates with a host-end communication terminal. The host-end communication terminal communicates with a user-end communication terminal, only when it is called from the user-end communication terminal. In either case, communication is made through a reflector server (repeater) 20.

Figure 2:
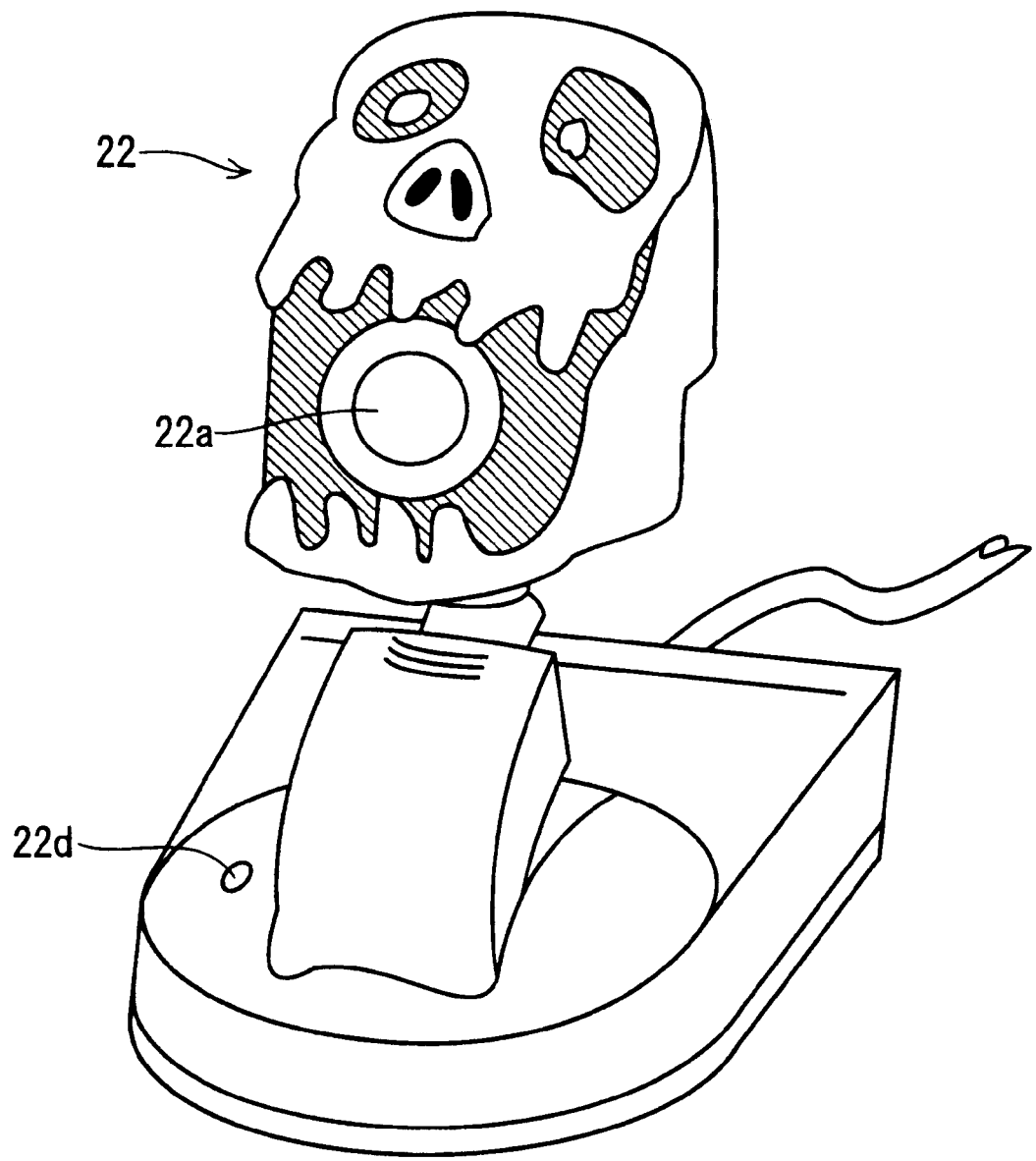
FIG. 2 is a perspective view showing one example of a peripheral equipment to be connected to a communication terminal.

The user-end communication terminals 14a and 14b are connected with respective mike-integrated cameras 22, as shown in FIG. 2. The camera head is covered by a doll or sculpture in a skull form. The camera head is provided with a camera unit 22a having an optical system to catch a subject image through an aperture formed in the skull. The other user-end communication terminals 14c and 14d are connected with respective mike-integrated cameras (not shown) each of which has a doll in the form of an animation character. The mike-integrated camera is assigned with identification information corresponding to the shape of the doll or sculpture.

Meanwhile, the parent site 16 is in the theme of horror, while the parent site 18 is in the theme of an animation. The parent site 16 is constituted by the host-end communication terminals 16a–16e, while the parent site 18 is by the host-end communication terminals 18a–18e. These host-end communication terminals are also connected respectively with mike-integrated cameras similarly to the above. Different ones of identification information are assigned respectively to the host-end communication terminals.

The identification information includes a plurality of category codes corresponding to a table as shown in FIG. 7. As understood from FIG. 7, the category to be covered by a category code 1 is broader than the category to be covered by a category code 2, and the category to be covered by the category code 2 is broader than the category to be covered by a category code 3. That is, the category to be covered by a category code becomes narrower as the coefficient increases.

The identification information assigned to the mike-integrated camera 22 of FIG. 2 includes a category code 1 representative of "horror" and a category code 2 representative of a "skull". On the other hand, if the mike-integrated camera connected to the user-end communication terminal 14c, 14d wears a doll of a "river horse", then the identification information assigned to this mike-integrated camera possesses a category code 1 representative of "animation", a category code 2 representative of "PM land" and a category code 3 representative of "river horse".

Because the parent site 16 is in the theme of horror, each host-end communication terminal 16a–16e has a category code 1 representative of "horror". However, the category code 2 is different among the host-end communication terminals 16a–16e. For example, the host-end communication terminal 16a possesses a category code 2 representative of a "skull". The host-end communication terminal 16b has a category code 2 representing a "vampire". The host-end communication terminal 16c has a category code 2 representing a "mechanical man". Thus, the host-end communication terminals 16a–16e are different from each other, with respect to identification information assigned thereto.

The parent site 18 is in the theme of animation, and the category codes 1–3 are assigned to the host-end communication terminals 18a–18e, in the similar manner to the above. That is, the category code 1 represents an "animation" at any of the terminals, but the category code 2 is among the terminals. The category code 3 is different on the basis of each terminal. In this manner, the host-end communication terminals 18a–18e are assigned with different identification information.

Figure 3:
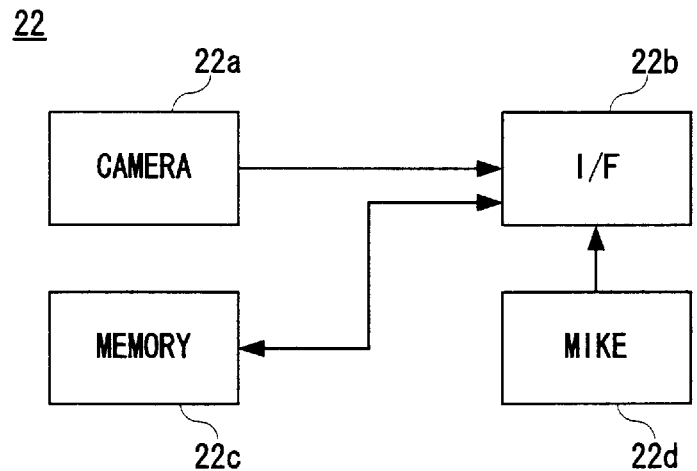
FIG. 3 is a block diagram showing a part of the FIG. 2 embodiment.

The mike-integrated camera 22 is structured as shown in FIG. 3. A camera 22a, a non-volatile memory 22c and a mike 22d are connected to an interface 22b. The mike-integrated camera 22 is connected to the communication terminal 14a or 14b through the interface 22d. The subject image data outputted from the camera 22a as well as the sound data output from the mike 22d are supplied via the interface 22b to the communication terminal 14a or 14b. Identification information is stored within the memory 22c.

Figure 4:
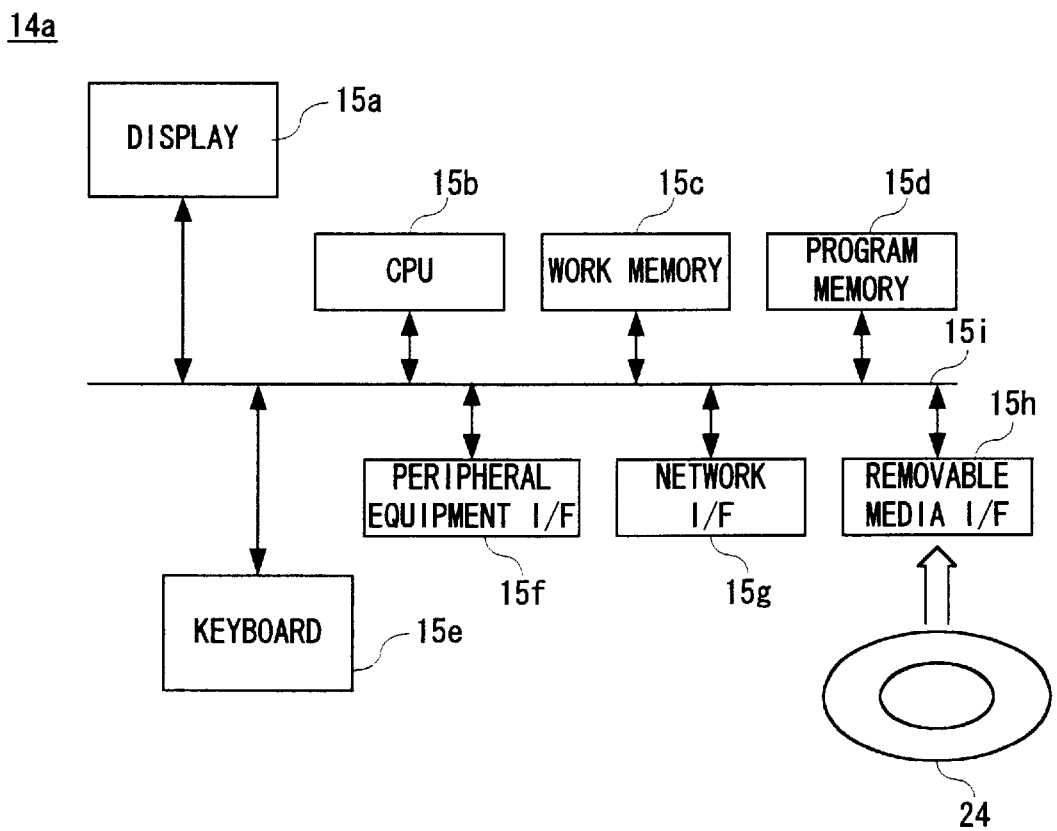
FIG. 4 is a block diagram showing a user-end communication terminal.

Referring to FIG. 4, the user-end communication terminal 14a includes a CPU 15b. The CPU 15b is connected, through a bus 15i, with a display 15a, keyboard 15e, work memory 15c, program memory 15e, peripheral equipment interface 15f, network interface 15g and removable media interface 15h. The communication interface 14a this configured is connected to the mike-integrated camera 22 of FIG. 2 through the peripheral equipment interface 15f, and also to the Internet 12 via the network interface 15g.

Further, a CD-ROM 24 recorded with an user-end communication control program is connected to the removable media interface 15h so that the user-end communication control program can be installed onto the program memory 15d via the interface 15h. Also, the identification information assigned to the mike-integrated camera 22 is read out of the memory 22c and written to the work memory 15c.

Figure 5:
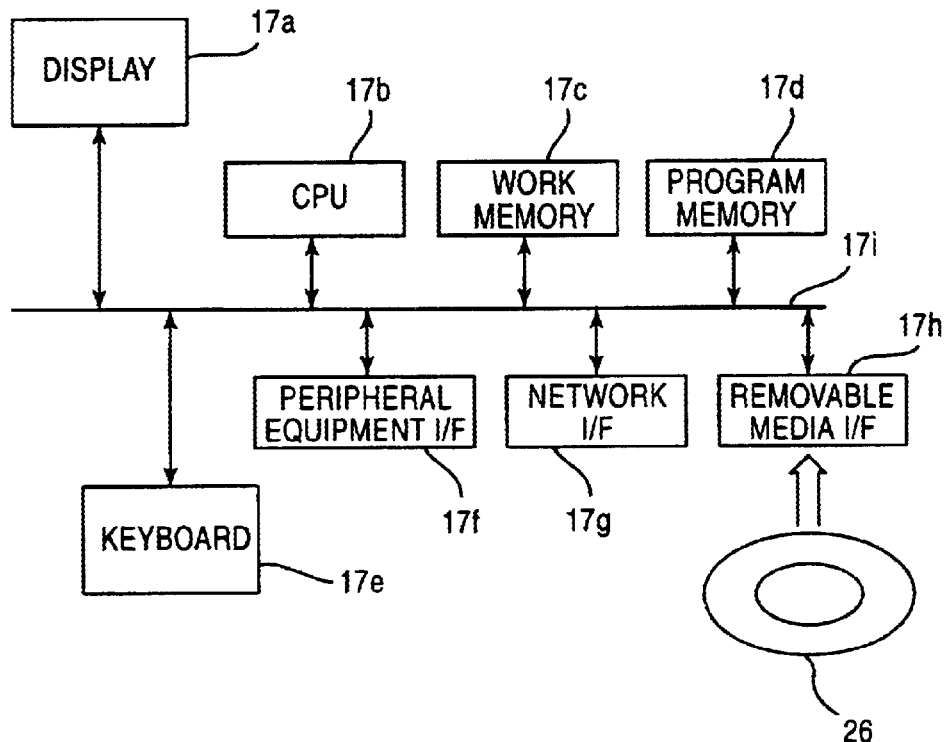
FIG. 5 is a block diagram showing a host-end communication terminal.

The host-end communication terminal 16a is configured as shown in FIG. 5. That is, a CPU 17b is connected, through a bus 17i, with a display 17a, keyboard 17e, work memory 17c, program memory 17e, peripheral equipment interface 17f, network interface 17g and removable media interface 17h. The communication terminal 16a is connected to the Internet through the network interface 17g, to the mike-integrated camera through the peripheral equipment interface 17f, and to a CD-ROM 26 via the removal media interface 17h. The CD-ROM 26 has a host-end communication control program recorded thereon. This communication control program is installed onto the program memory 17d via the interface 17h. The identification information read from the mike-integrated camera is stored in the work memory 17c.

Figure 6:
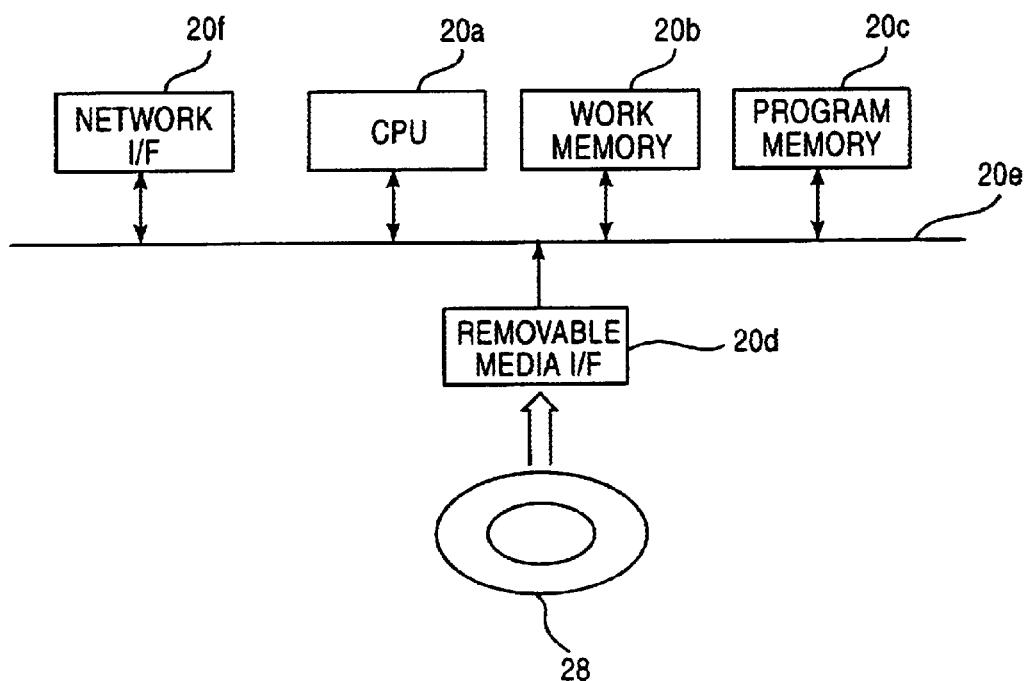
FIG. 6 is a block diagram showing a reflector server.

The reflector server 20 is configured as shown in FIG. 6. That is a CPU 20a, a work memory 20b, a program memory 20c and a removable media interface 20d are connected with one another through a bus 20e. The communication control program for the reflector server 20 is recorded on a CD-ROM 28. This communication control program is installed onto the program memory 20c through the interface 20d.

Incidentally, the other user-end communication terminals 14b–14d are configured as shown in FIG. 4, while the other host-end communication terminals 16b 16e and 18a–15e are also configured as shown in FIG. 5, omitting duplicated explanations.

Figure 8:
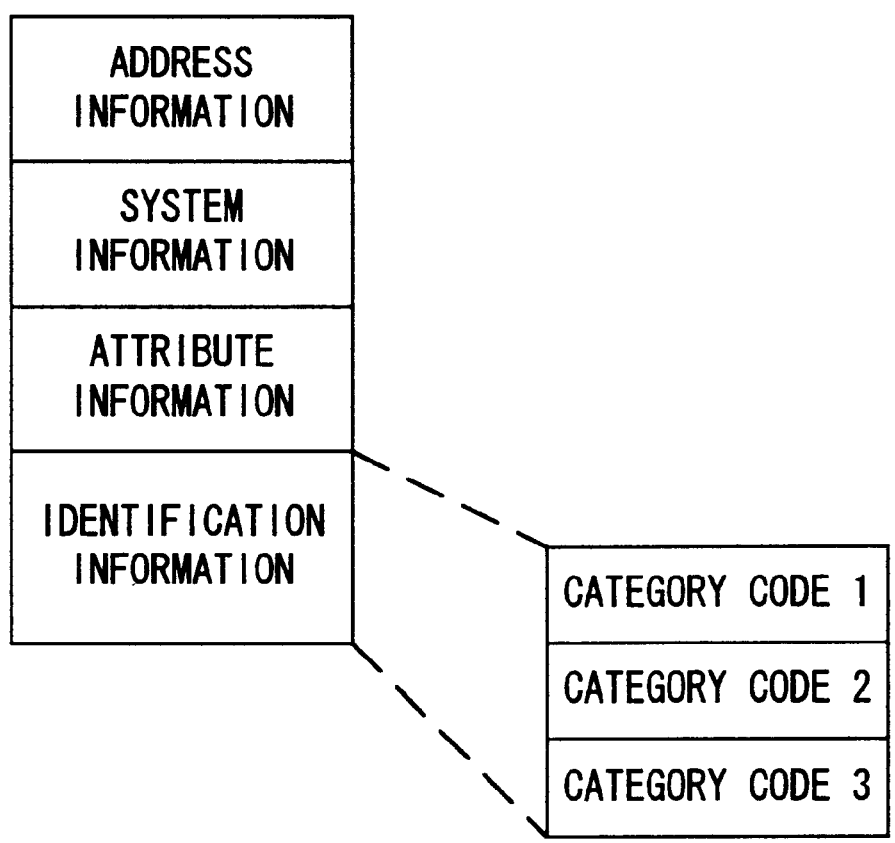
FIG. 8 is an illustrative view showing a configuration of communication terminal information.

The user-end communication terminals 14a–14d, at the start of communication, transmits communication terminal information, together with a request to establish a connection state, to the reflector server 20. The communication terminal information includes, as shown in FIG. 8, address information, system information, attribute information and the above-mentioned identification information. The address information is assigned to each communication terminal when it is subscribed or registered to the communication service of this embodiment. Also, the system information includes communication speed, communication form, user information, service contents and so on. Further, the attribute information is representative of whether the own terminal is a user-end terminal or a host-end terminal, or its grade.

The host-end communication terminal 16a–16c and 18a–18e, at a start of communication, also transmit similar communication terminal information to the reflector server 20.

Upon receiving such communication terminal information, the reflector server 20 registers the communication terminal information to the work memory 20b shown in FIG. 6. If the communication terminal information is registered in the work memory 20b, connection is established between the communication terminal and the reflector server, and the communication terminal is put in a standby state. The communication terminal in such a standby state is a currently-capable of communication terminal.

Incidentally, the reflector server 20 is always activated and the host-end communication terminals 16a–16e and 18a–18e are always connected to the reflector server 20.

Figure 9:
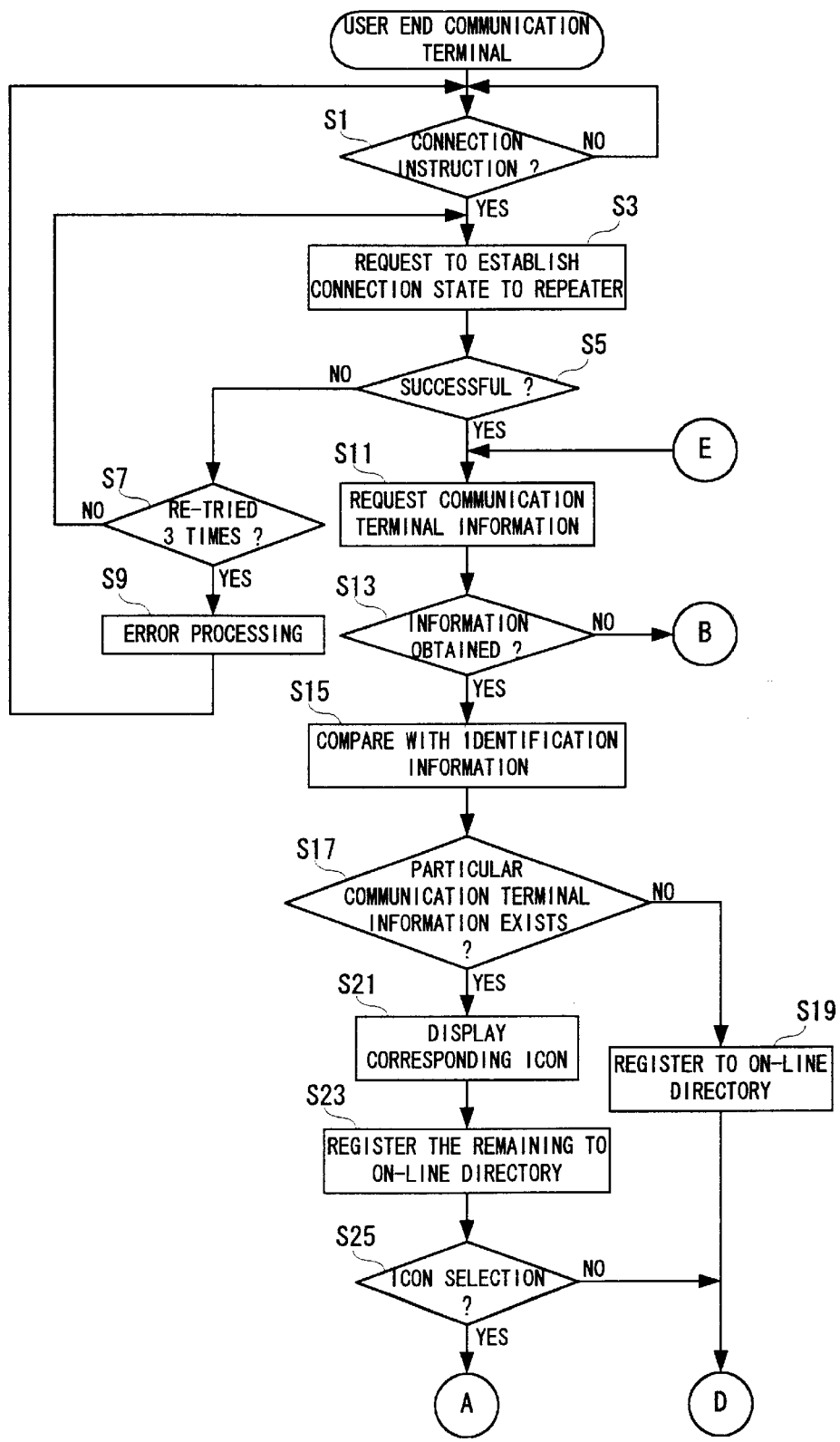
FIG. 9 is a flowchart showing one part of operation of the user-end communication terminal shown in FIG. 4.
Figure 10:
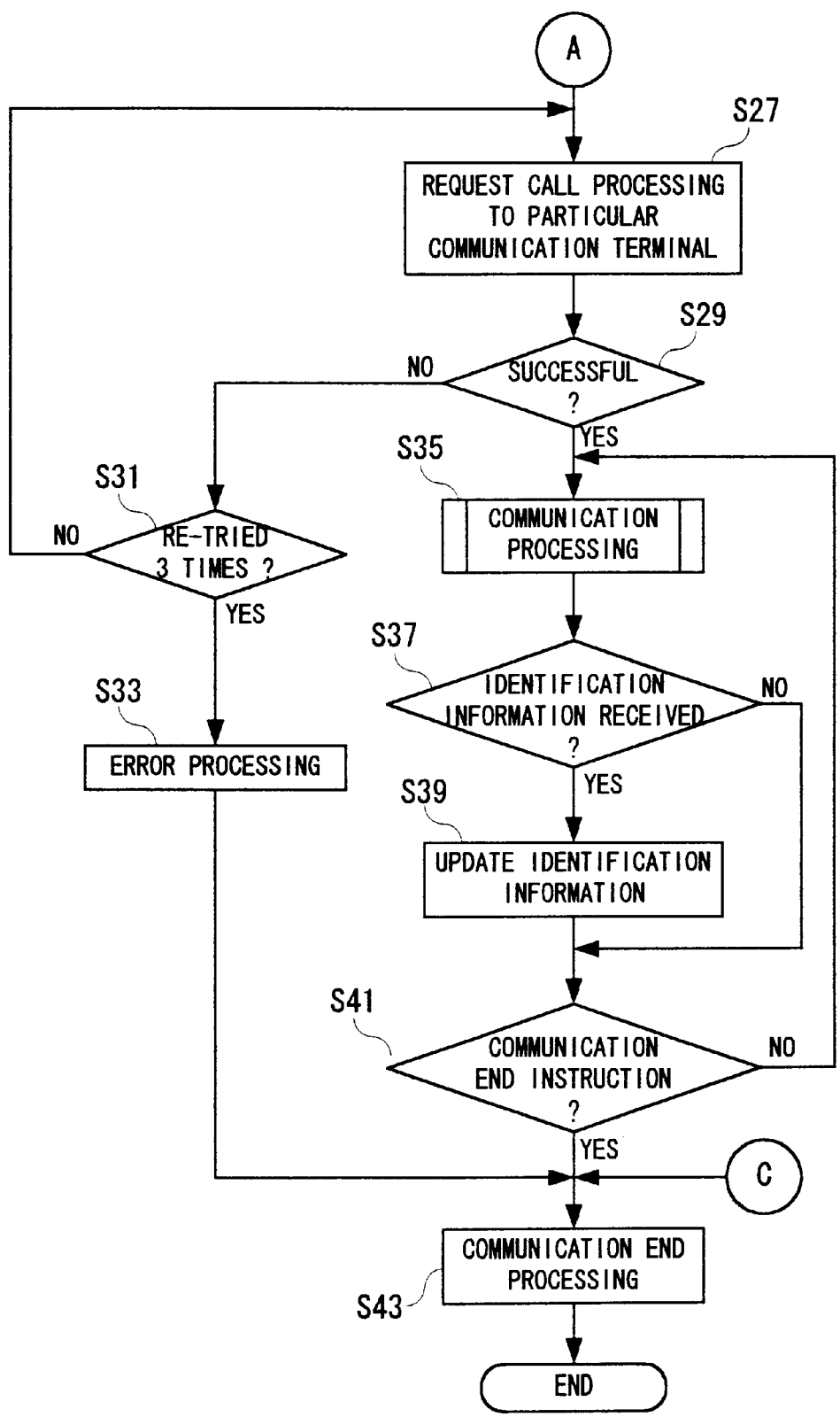
FIG. 10 is a flowchart showing another part of operation of the user-end communication terminal shown in FIG. 4.
Figure 11:
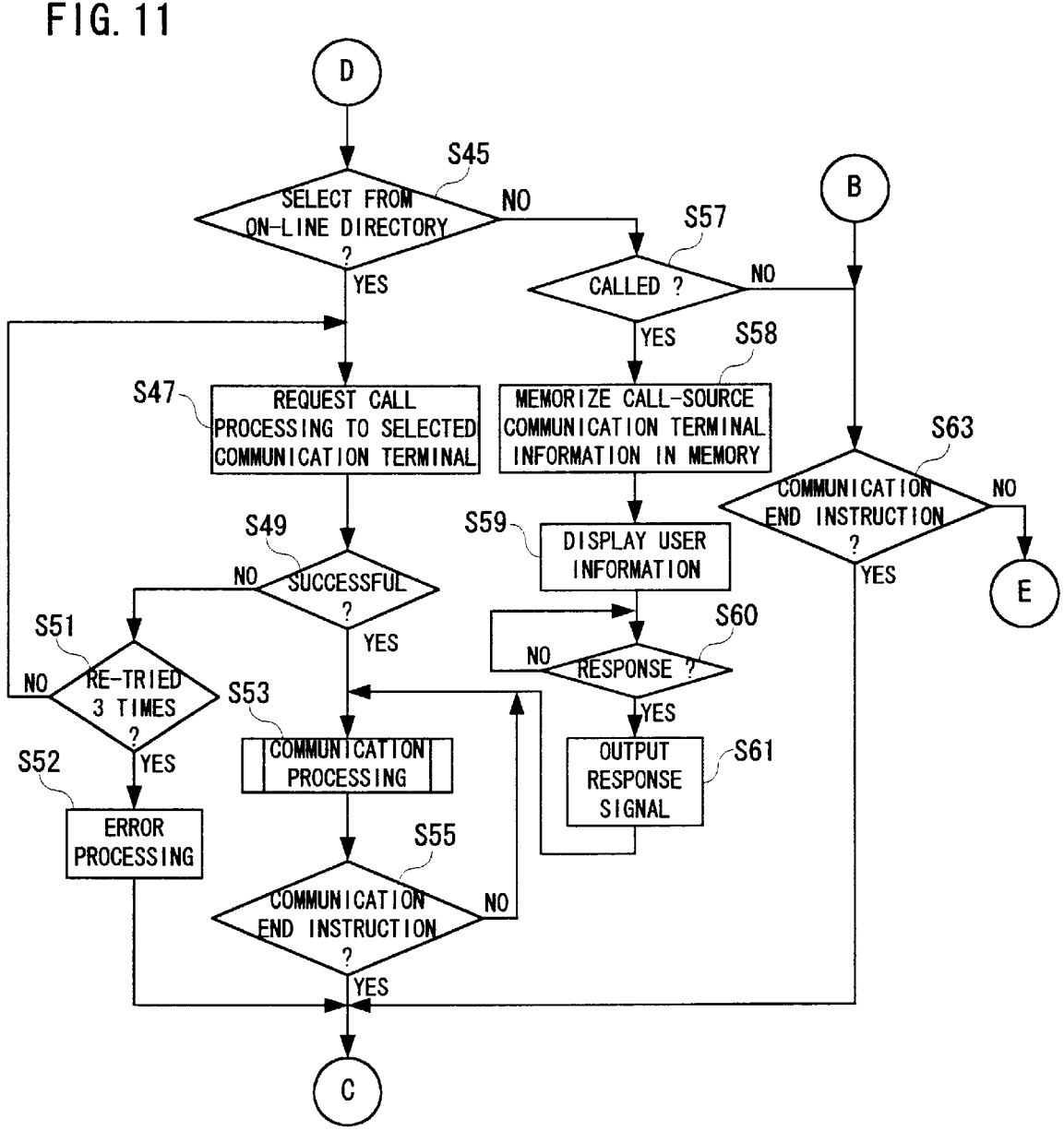
FIG. 11 is a flowchart showing still another part of the operation of the user-end communication terminal shown in FIG. 4.

When a user uses a communication terminal 14a to communicate with another user or host, the CPU 15b provided in the users-side communication terminal 14a processes on the flowchart shown in FIG. 9 to FIG. 11. Also, the CPU 20a provided in the reflector server 20 relays communication, according to the flowchart shown in FIG. 12 and FIG. 13. The CPU 17b provided in the host-end communication terminal 16a communicates with the user, according to flowcharts shown in FIG. 14 and FIG. 15. Incidentally, the flowcharts of FIG. 9 to FIG. 11 correspond to the communication control program installed onto the program memory 15d from the CD-ROM 24 shown in FIG. 4. Also, the flowcharts of FIG. 12 and FIG. 13 correspond to the communication control program installed onto the program memory 20c from the CD-ROM 28 shown in FIG. 6. The flowcharts of FIG. 14 and FIG. 15D corresponds to the communication control program installed onto the program memory 17d from the CD-ROM 26 of FIG. 5.

Referring first to FIGS. 9 to 11, the CPU 15b first determines in step S1 whether a connection instruction was given from the operator (user) or not. If "YES" then CPU 15b, in step S3, requests the reflector server 20 to establish a connection to the reflector server 20. At this time, the communication terminal information including the identification information assigned to the mike-integrated camera 22 is transmitted simultaneously. The CPU 15b subsequently determines in step S5 whether a connection was established to the reflector server 20 or not. If no approval signal is input from the reflector server 18, the CPU determines a failure in establishing a connection, and the process advances to step S7. In the step S7 it is determined whether an establishing, request has been outputted 3 times or not. If "NO", the process returns to the step S3, while if "YES" the process returns to the step S1 via an error process of step S9.

If an approval signal is input from the reflector server 20, the CPU 15 determines a success to establish connection to the reflector server 20, and in step S11 requests communication terminal information to the reflector server 20. That is, requested is the communication terminal information that has been registered in the work memory 20b shown in FIG. 6. If there is such a request, the reflector server 20 transmits, to the request source, the communication terminal information of a communication terminal that is already registered in the work memory 20b but in a state of not communicating communication (in a standby state). The CPU 15b determines in step S13 whether communication terminal information was obtained from the reflector server 20 or not. Where obtained, the process advances from the step S13 to step S15. In the step S15, comparison is made between the identification information included in the obtained communication terminal information and the identification information written on the work memory 15c. It is determined in step S17 whether the compared communication terminal information possesses common identification information or not.

The identification information possessed by the user-end communication terminal 14a includes a category code 1 representing of "horror" and a category code 2 representative of a "skull". The communication terminal having such a same identification information as this identification information is the host-end communication terminal 16a and the user-end communication terminal 14b. Due to this, the host-end communication terminal 16a and the user-end communication terminal 14b are the associated particular communication terminals for the communication terminal 14a. Similarly, for the user-end communication terminal 14b the host-end communication terminal 16a and the user-end communication terminal 14a are the associated particular communication terminals. The user-end communication terminals 14a and 14b are the associated particular communication terminals for the host-end communication terminal 16a. In this manner, the communication terminal possessing the same identification information as that of its communication terminal is an associated particular communication terminal. The communication terminal information output from such a particular communication terminal is defined as particular communication terminal information.

The reflector server 20 transmits communication terminal information on a communication terminal in a standby state to a requesting source. Accordingly, if the communication terminal 16a or 14b is in a standby state, the CPU 15 determines a "YES" in step S17. Contrary to this, if for example the communication terminals 16a and 14b are communicating with each other and the communication terminal 14a cannot acquire particular communication terminal information, then the CPU determines a "NO" in the step S17.

If "YES" is determined in the step S17, the CPU 15b proceeds to step S21 to display, on the display 15a, an icon (character) corresponding to the identification information possessed by its own terminal, and registers communication terminal information that it is in a standby state but accepting particular communication terminal information to the on-line directory. Because the communication terminal 14a has the category code 2 representing a "skull", a character of a "skull" is displayed on the display unit 15a. Incidentally, the data of the character of a "skull" is written on the work memory 15c, and such a character is displayed in the number of particular communication terminals being in a standby state.

In step S25 it is determined whether the icon displayed on the display unit 15a was selected by the operator or not. If "YES", the process advances to step S27 to request, to the reflector server 20, a call process to a particular communication terminal corresponding to the selected icon. In step S29 it is determined whether the particular communication terminal was connected to this communication terminal or not. If no response signal was transmitted from the particular communication terminal, the CPU, 15b determines that the connection was a failure, and then determines in step S31 whether the process of the step S27 has been tried 3 times or not. If a "NO", the process returns to the step S27, while if a "YES", the process advances to step S43 after performing an error process by the step S33.

Where a response signal was transmitted from the particular communication terminal, the CPU 15 determines the particular communication terminal was successfully connected, and carries out communication processing in step S35. Due to this, the operator on the user-end communication terminal 14a is allowed to engage in telephone talk with an operator on the particular communication terminal side, by using the mike-integrated camera 20. That is, so-called television telephone talk becomes feasible. Where a person on the other side of communication is the host, the duration of the call is added or counted on the host-end. If the call duration exceeds a predetermined count value, a new one of identification information is transmitted from the host. Due to this, the CPU 15b determines in step S37 as to whether new identification information was received or not.

While the call duration does not exceed the predetermined count value, the CPU 15 advances from the step S37 to step S41 to determine whether any of the operators input an instruction to end the communication or not. If a "NO", the CPU 15b returns to the step S35 to continuously process the communication. If the call duration exceeds the predetermined count value and new identification information is received, the CPU 15b determines a "YES" in the step S37 and then in step S39 updates the identification information. That is, the identification information stored in the work memory 15c is updated by the received new identification information, and the identification information stored in the memory 22c of the mike-integrated camera 22 is also updated. Input having a communication ending instruction, the CPU 15b determines a "YES" in step S41, and advances to the step S43. Incidentally, it is determined that the other operator has instructed to end the communication if an end signal is input by the opposite of communication.

If a "NO" is determined in the step S25 or the step S19 was processed, the CPU 15b processes steps S45, S57 and S63. In the step S45 it is determined whether or not a communication terminal was selected from the on-line directory, in the step S57 whether there was a call from the reflector server 20 or not, and in the step S63 it is determined whether or not a communication end instruction was given. If these determinations are all "NO", the CPU 15 returns from the step S63 to the step S11 to repeat the above process. Incidentally, the process of the step S63 is also executed where "NO" is determined in the step S13.

If a desired communication terminal is selected from the on-line directory, the CPU 15b advances from the step S45 to the step S47 to request, the reflector server 20, a call process to the selected communication terminal. In step S49, it is determined whether a connection to the desired communication terminal was successfully made by this call process request (communication start request) or not. If the connection results in a failure, it is determined in step S51 whether a connection to the desired communication terminal was tried 3 times or not. If "NO", results here, the process returns to the step S47, while if "YES" results here, an error process is performed by step S52 and then the process advances to step S43.

Where a connection to the desired communication terminal is successfully made, the CPU 15b performs, in step S53, a communication process and determines in step S55 whether a communication end instruction was given by itself or from the other side or not. The CPU 15b repeats the process of the step S53 unless a communication end instruction is given. However, if a communication end instruction is given, the process advances to the step S43. Incidentally, because the communication terminal selected from the on-line directory is not a particular communication terminal, an identification information update process as in the steps S37 and S39 is not performed between the step S53 and the step S55.

If there was a call from the reflector server 20, the CPU 15b proceeds from step S57 to step S58 to write call-source communication terminal information onto the work memory 15c. The call-source communication terminal information is output, together with a call signal, from the reflector server 20. In the step S58 this communication terminal information is written to the work memory 15c. The CPU 15b further detects in step S59 user information on the calling source from communication terminal information and displays it on the display 15a. If the operator responds to this call signal, the CPU 15b in step S61 outputs a respond signal to the request source, and thereafter advances to the step S53.

In a state that the operator on the communication terminal 14a side did not select a communication terminal from the on-line directory and there was no communication (the communication terminal 14a is in a standby state), if the operator on the communication terminal 14a side inputs a communication end instruction, the CPU determines a "YES" in step S63. At this time, the CPU 15b advances to the step S43.

In the step S43 a communication end process is performed. Where an end instruction is input by itself, an error process is executed or a communication end is instructed in a standby state, the CPU 15b releases the connection after outputting all end signal to the reflector server 20. On the other hand, if the other side input an end instruction, the process is ended without outputting an end signal.

Figure 12:
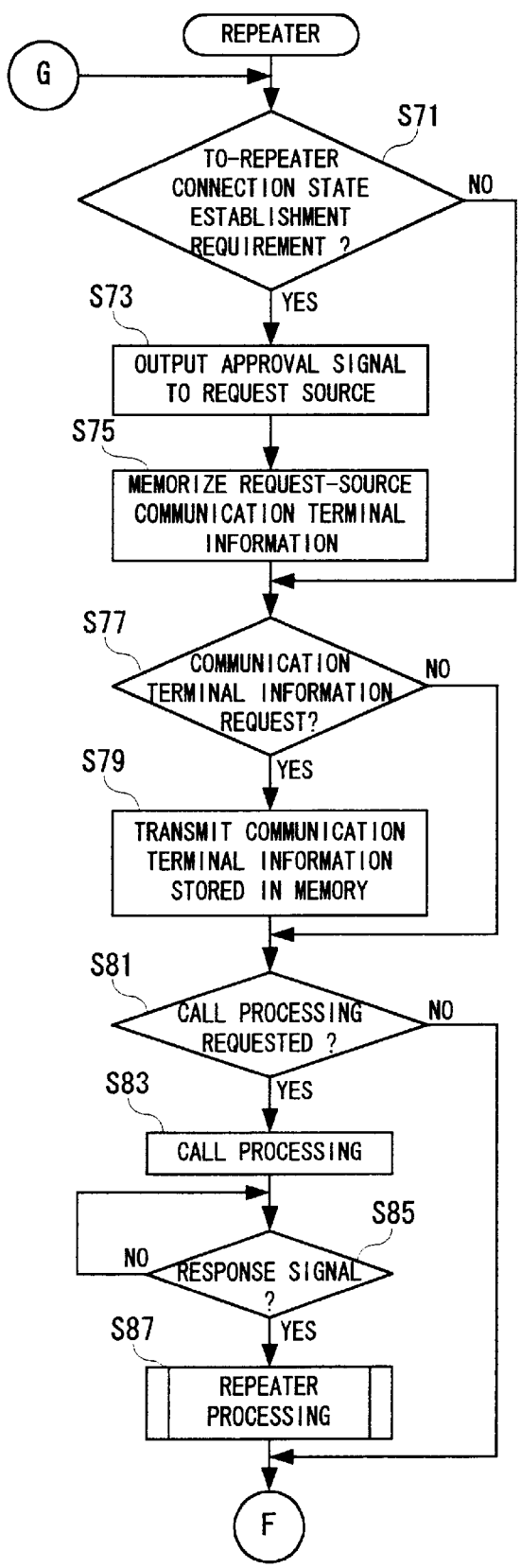
FIG. 12 is a flowchart showing one part of operation of the reflector server shown in FIG. 6.
Figure 13:
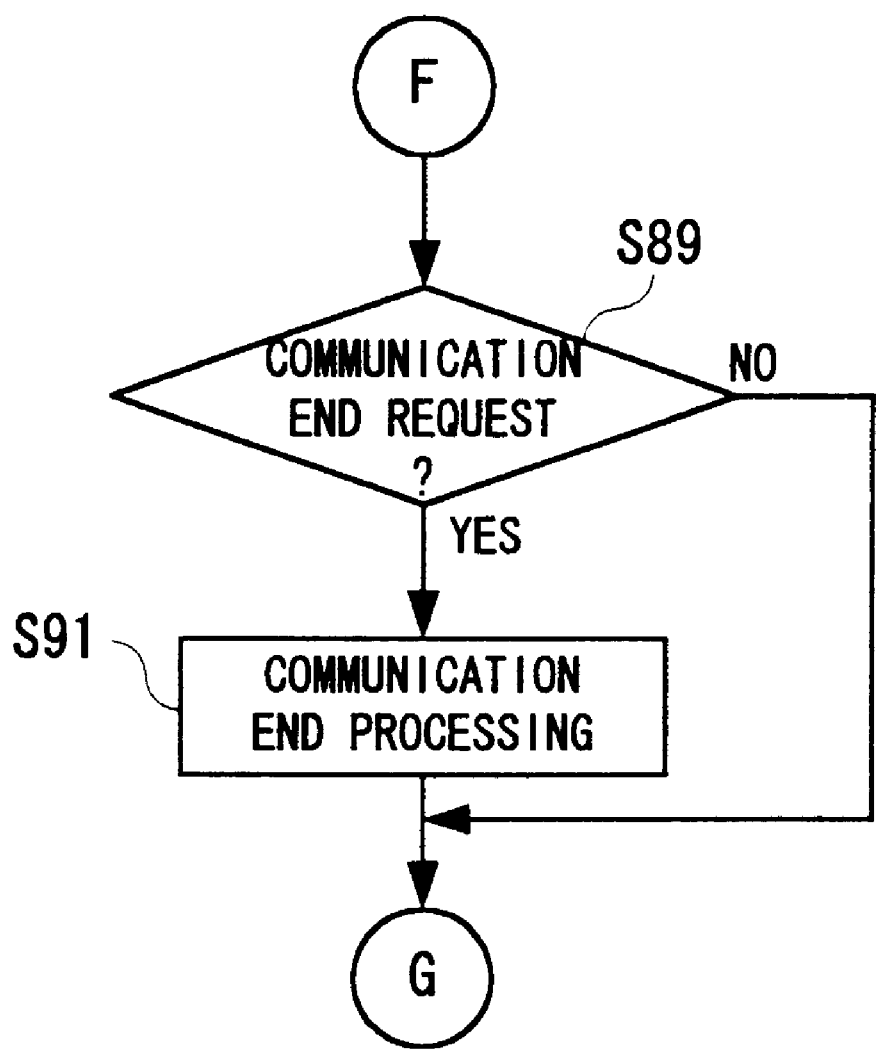
FIG. 13 is a flowchart showing another part of the operation of the reflector server shown in FIG. 6.

The CPU 20a provided on the reflector server 20 relays communication between users or a user and a host, according to the flowchart shown in FIG. 12 and FIG. 13.

The CPU 20a processes on the steps S71, S77, S81 and S89, thereby determining what request was given from the communication terminal. Specifically, the presence or absence of a connection establishing request to the reflector server 20 is determined in step S71, while the presence or absence of a request of communication terminal information is determined in step S77. Also, the presence or absence of call process request to a desired communication terminal (communication start request) is determined in step S81, while the presence or absence of a communication end request is determined in the step S89.

If there is a connection establishing request to the reflector server 20, the CPU 20a proceeds from the step S71 to step S73 to transmit an approval signal to a request-source communication terminal. Further, in step S75 the request-source communication terminal information is registered in the work memory 20b. That is, because the request-source communication terminal transmits communication terminal information together with the connection establishing request, in the step S75 this communication terminal information is written onto the work memory 20b.

If there is a request for communication terminal information, the CPU 20a advances from the step S77 to step S79. Among the registered terminals with communication terminal information within the work memory 20b, the communication terminal information indicating a standby state only is transmitted to the request-source communication terminal.

If there is a calling process request to the desired communication terminal, the CPU 20a advances from the step S81 to step S83 to perform a call process to the desired communication terminal. Because of this, a call signal is transmitted, together with the request-source communication terminal information, to the desired communication terminal. If there is a call to the desired communication terminal and the operator at that desired communication terminal responds to this call, a response signal is sent back to the reflector server 20. The CPU 20a determines in step S85 on the presence or absence of such a response signal. If there is a response signal, then in step S87 a relay process is carried out.

If a communication end request comes from the communication terminal, the CPU 20a in step S89 determines a "YES". The end signal transmitted from the communication terminal is meant to request the end of communication. The CPU 20a, upon receiving an end signal, performs a communication end process in step S91. If all end signal is output from one of the two communication terminals in a transmission state, then in step S91 this end signal is transmitted to the other communication terminal and the communication terminal information on these two communication terminals are deleted from the work memory 20b. On the other hand, when an end signal is output from a communication terminal in a standby or error state, in the step S91 the communication terminal information on the output source is deleted from the work memory 20b. In this case, no end signal is transmitted to the other communication terminal.

Figure 14:
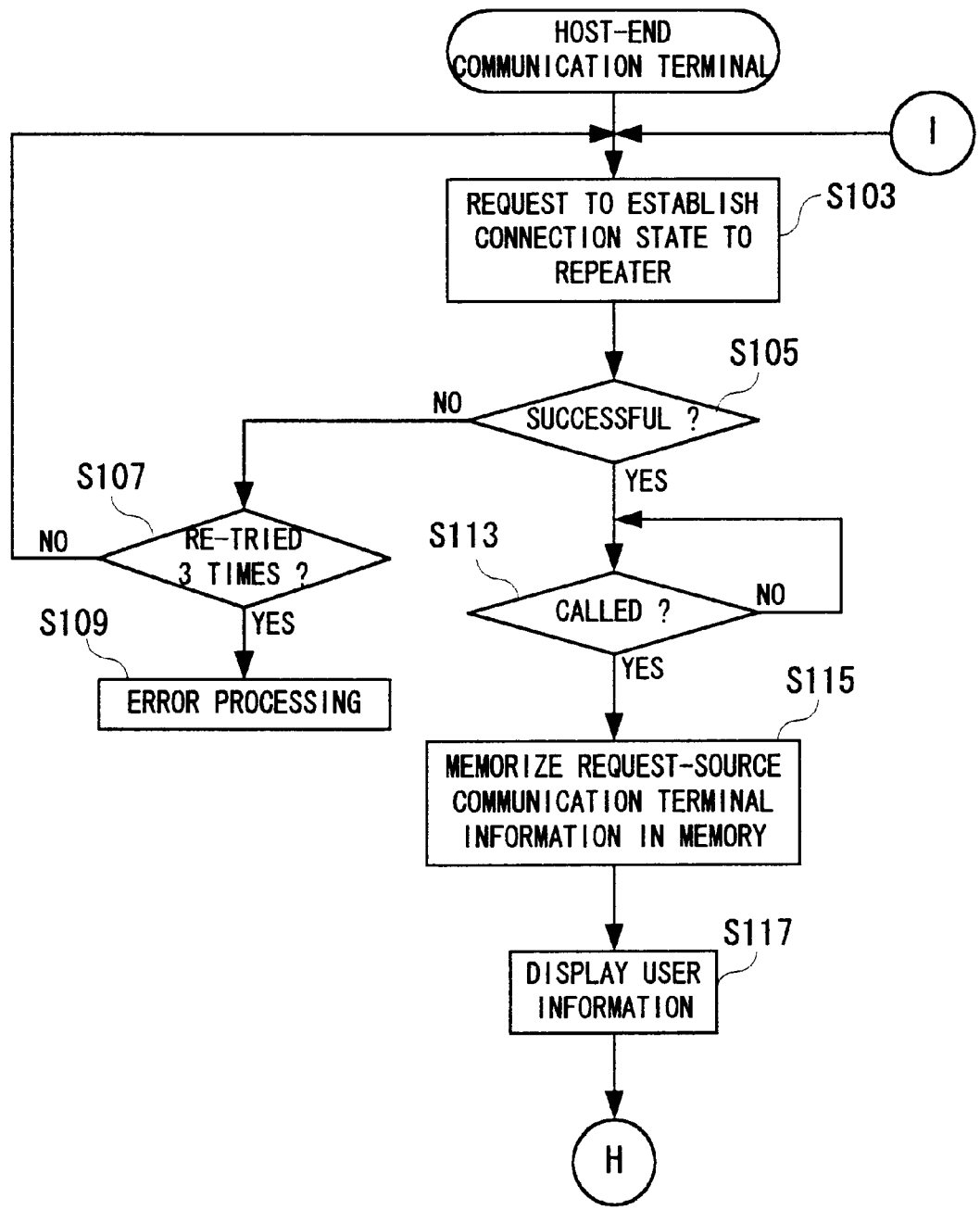
FIG. 14 is a flowchart showing one part of operation of the host-end communication terminal shown in FIG. 5.
Figure 15:
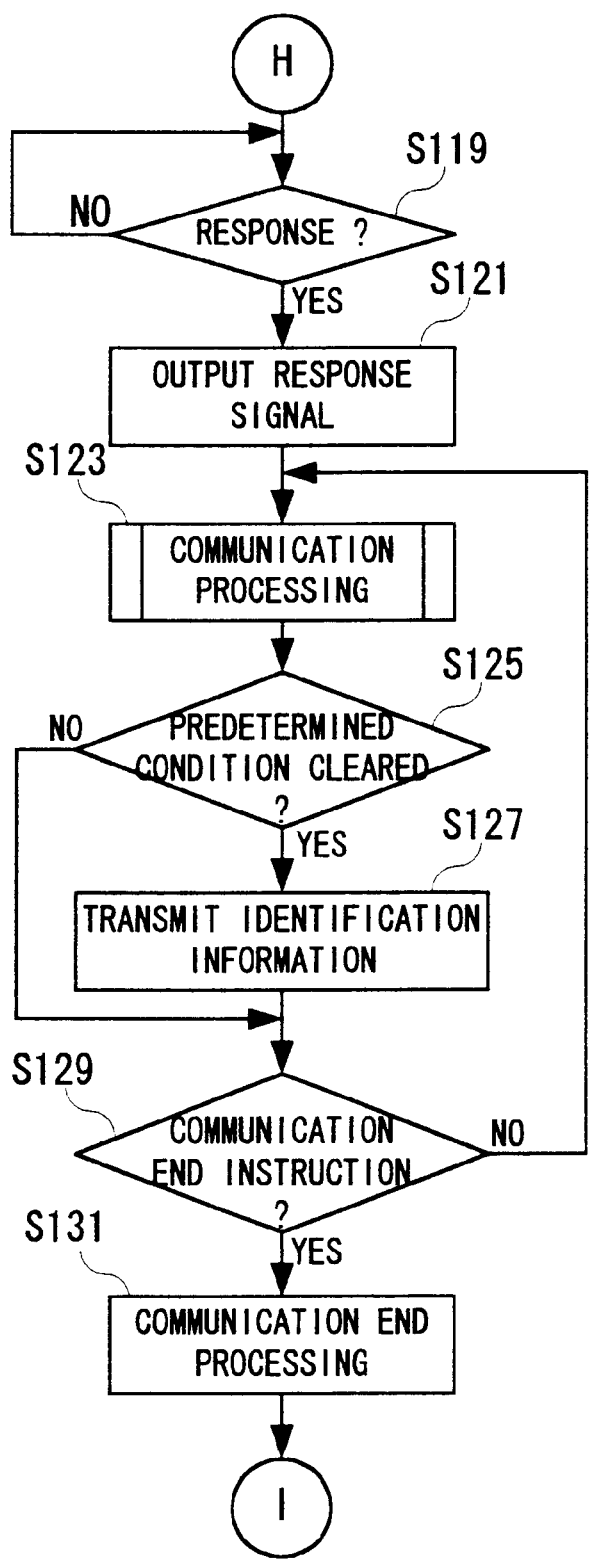
FIG. 15 is a flowchart showing another part of the operation of the host-end communication terminal shown in FIG. 5.

The CPU 17b provided on the host-end communication terminal 16a performs communication with the user-end communication terminal, according to the flowcharts shown in FIG. 14 and FIG. 15.

The CPU 17b in step S103 first transmits a connection establishing request with the reflector server 20 together with its own communication terminal information, to the reflector server 20. The CPU 17b subsequently advances to step S105 to determine by an approval signal whether a connection to the reflector server 20 was successful or not. If the connection was a failure, then it is determined in step S107 whether a process of the step S103 was tried 3 times or not. If a "NO", the process returns to the step S103. If a "YES", an error process of step S109 is carried out.

If the connection to the reflector server 20 was successful, the CPU 17b advances from the step S105 to step S113 where it waits for a call from the reflector server 20. If the CPU 17b is given by a call signal and communication terminal information from the reflector server 20, it determines in step S113 that there was a call. Thereupon, the CPU 17b in step S115 writes call-source communication terminal information onto the work memory 17c, and displays in step S117 call-source user information on the display 17a.

If the operator responds to this call, the CPU 17b in step S119 determines a "YES", and sends back in step S121 a response signal to the reflector server 20. Furthermore, in step S123 communication processing is made to and from the call-source user-end communication terminal. The host-end communication terminal 16a counts or totals the call duration, regardless of whether or not the call source is a particular communication terminal possessing common identification information. The call duration or totaled counted is held even after ending once communication, and accumulated each time communication is made with the same communication terminal.

In step S125 it is determined whether the total call duration exceeds a predetermined count value or not. If the determination is "NO", the process proceeds to step S129, while if "YES", the process advances to the step S129 after transmitting new identification information to the opposite side. In the step S129 it is determined whether a communication end instruction was input or not. If the determination is "NO", the process returns to the step S123, while if the determination is "YES" the process returns to the step S103 via a communication end process in step S131. In step S131, a similar process to step S43 is carried out. That is, when the end instruction was input by oneself the connection is released after outputting an end signal to the reflector server 20. On the other hand, when an end instruction was input from the opposite side, the connection is released without outputting an end signal.

Where a communication-destination user-end communication terminal is a particular communication terminal, the identification information possessed by this user-end communication terminal is updated by new identification information. This new identification information represents an opposite-side associated host-end communication terminal next time. That is, for the user-end communication terminal before updating the identification information, the host-end communication terminal 16a is its associated particular communication terminal. However, if the identification information is updated, the host-end communication terminal having the same identification information as the identification information after being updated becomes an associated particular communication terminal. Incidentally, if the communication-destination user-end communication terminal is not an associated particular communication terminal, that user-end communication terminal does not receive new identification information. As a result, the identification information is not updated.

Figure 16:
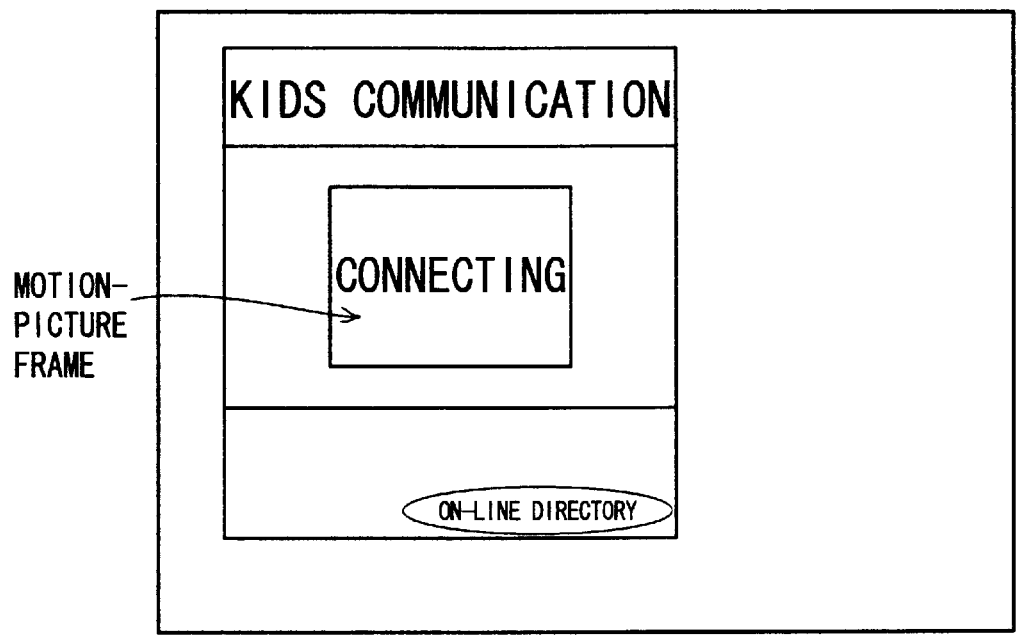
FIG. 16 is an illustrative view showing one part of operation of the user-end communication terminal shown in FIG. 4.
Figure 17:
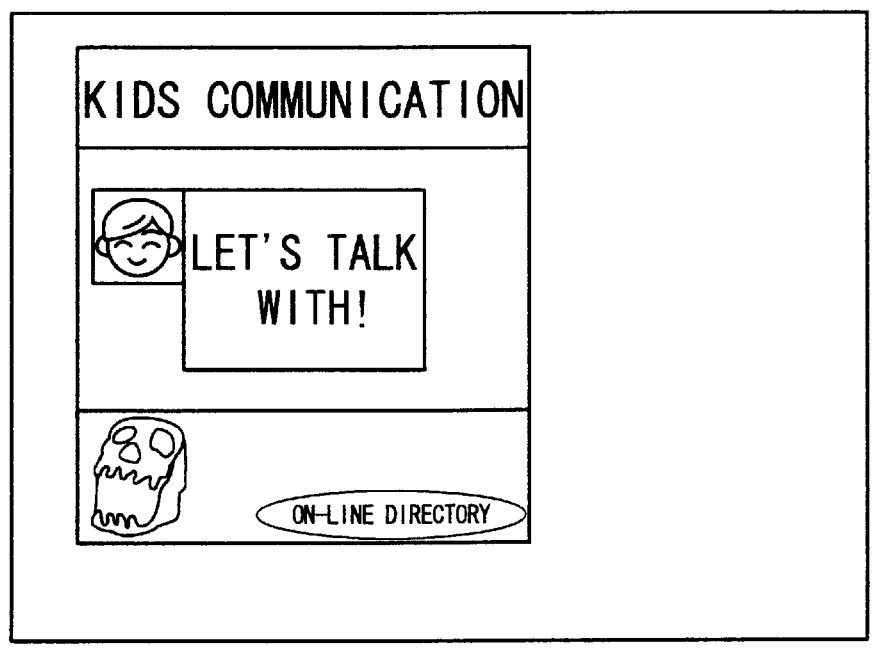
FIG. 17 is an illustrative view showing another part of the operation of the user-end communication terminal shown in FIG. 4.

The new identification information to be outputted by the host-end communication terminal 16a includes, concretely, a category code 1 representing "horror" and category code 2 representing a "vampire". Due to this, if the operator on the user-end communication terminal 14a talks over the telephone with the host-end communication terminal 16a for a predetermined time period or longer, the present identification information including a category code 1 representing "horror" and a category code 2 representing a "skull" is updated by new identification information. The host-end communication terminal 16b is assigned with the same identification information as the new identification information. The particular communication terminal with which the user-end communication terminal 14a is to communicate next time will be the host-end communication terminal 16b. In this manner, identification information is updated depending upon the duration of call, and the particular communication terminal changes from one to another within the same parent site. It is needless to say that the particular communication terminal on the user-end also changes from one to another.

Where the user-end communication terminal 14a accesses the host-end communication terminal 16a, the display 15a screen provided on the user-end communication terminal 14a varies, as follows. When trying to establish a connection to the reflector server 20, an image of FIG. 16 is displayed on the screen. Within a motion-picture frame, characters indicating "connecting" is displayed. If a connection to the reflector server 20 is successful and communication terminal information is transmitted from the reflector server 20, an image shown in FIG. 17 is displayed on the display 17a. In the motion-picture frame, letters "Let's talk with !" are displayed. On a left side of the motion-picture frame is displayed a face of the operator taken by the mike-integrated camera 22. Further, if the host-end communication terminal 16a is in a standby state, an icon "skull" is displayed on an under side of the motion-picture frame. That is, because the present identification information possesses the category code 2 representing a "skull", an icon "skull" is displayed.

Figure 18:
FIG. 18 is an illustrative view showing still another part of the operation of the user-end communication terminal shown in FIG. 4.

Here, if the operator on this side clicks the "skull" icon, a call process request to the host-end communication terminal 16a is output. If the operator on the host-end communication terminal 16a responds to this call process request, a connection is made between the user-end communication terminal 14a and the host-end communication terminal 16a through the reflector server 20. As a result, the operator on the host-end is displayed on the motion-picture frame as shown in FIG. 18. The operators on this side and the opposite side are enabled to communicate with voice and image. Incidentally, where the telephone talk extends over a predetermined time period or longer and identification information is obtained which includes a category code 2 representing a "vampire", in a next connection an icon of a "vampire" will be displayed on the under side of the motion-picture frame.

Figure 19:
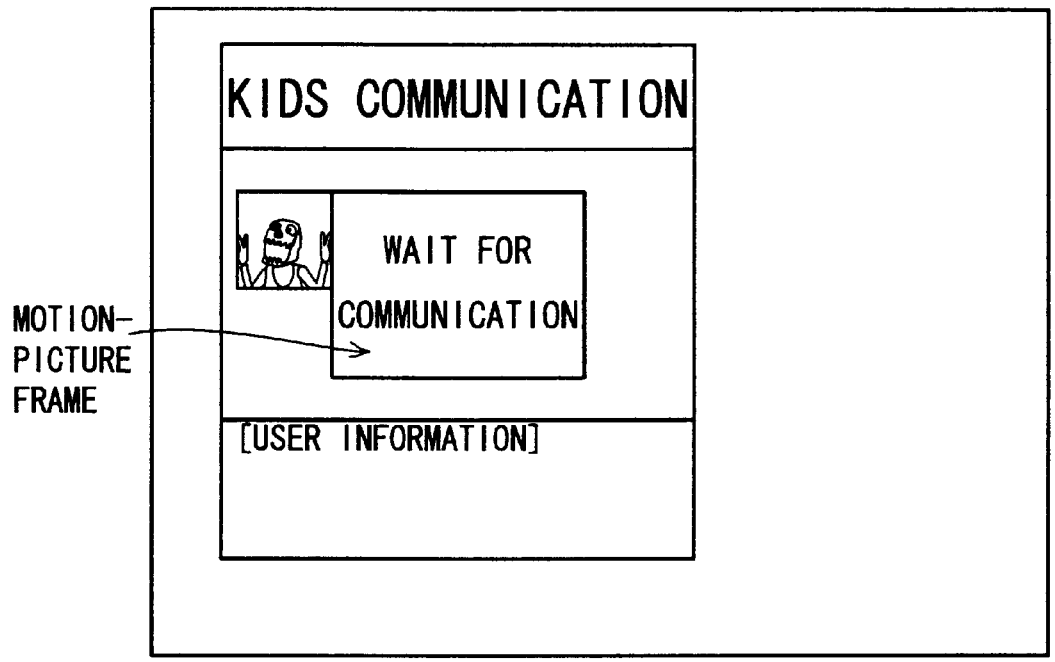
FIG. 19 is an illustrative view showing one part of an operation of the host-end communication terminal shown in FIG. 6.
Figure 20:
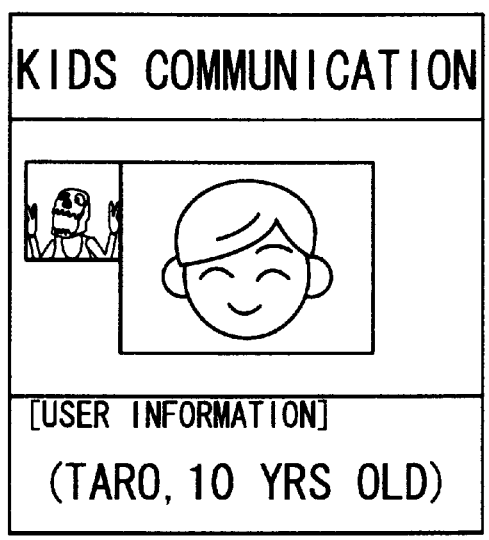
FIG. 20 is an illustrative view showing another part of the operation of the host-end communication terminal shown in FIG. 5.

On the other hand, when the host-end communication terminal 16a is accessed by the user-end communication terminal 14a, the display 17a provided on the host-end communication terminal 16a changes of the display as follows. Before accessed by the user-end communication terminal 14a (standby state), an image as shown in FIG. 19 is displayed on the display 17a. Letters indicating "waiting communication" are displayed on the motion-picture frame, and the operator on the parent-site side is displayed on the left side of the motion-picture frame. If a call comes from the user-end communication terminal 14a and the operator responds to this call, a connection is made between the user-end communication terminal 14a and the host-end communication terminal 16a through the reflector server 20. As a result, a face of the user-end operator is displayed within the motion-picture frame, and telephone communication is rendered. Under the motion-picture frame, user information is displayed.

Figure 21:
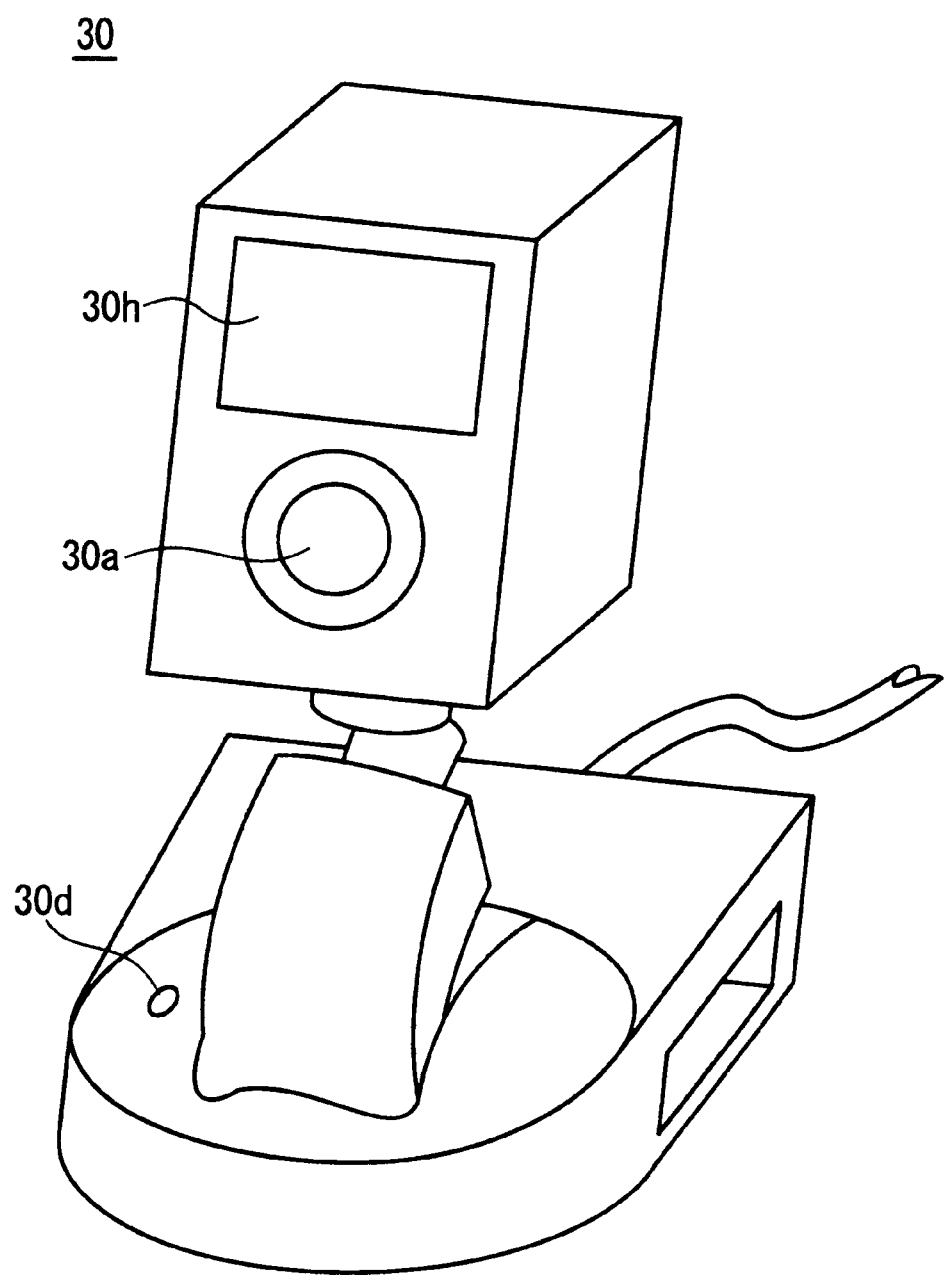
FIG. 21 is an illustrative view showing another example of a peripheral equipment to be connected to the communication terminal.
Figure 22:
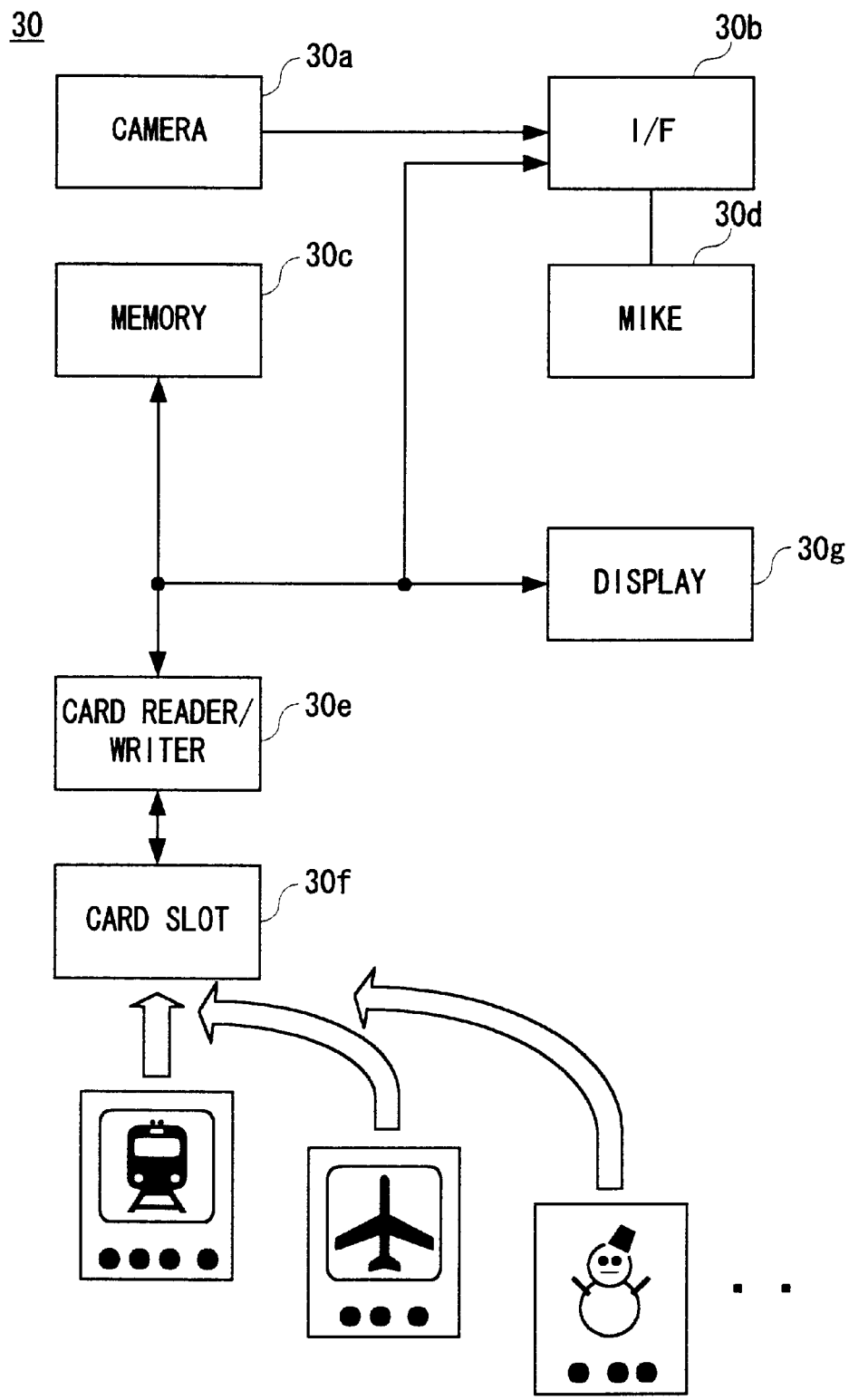
FIG. 22 is a block diagram of the peripheral equipment shown in FIG. 21.

Referring to FIG. 21, a mike-integrated camera 30 in another embodiment has its camera head exposed to the exterior. That is, although the mike-integrated camera 22 shown in FIG. 2 had the camera head 22a covered by the doll or sculpture in the form of a skull, this mike-integrated camera 30 does not wear such a doll or sculpture. Instead, a display unit 30h is provided over a camera unit 30a in order to display thereon a character associated with own identification information. The mike-integrated camera 30 is configured as shown in FIG. 22. To an interface 30b are connected a camera unit 30a, a memory 30c and a mike 30d, similarly to the mike-integrated camera 22 as was shown in FIG. 3. In addition, a card reader/writer 30e and the above-mentioned display unit 30h are connected to the interface 30b.

A card recorded with identification information through punches, magnetism or hologram is inserted into a card slot 30f. The identification information recorded on the card is read by the card reader/writer 30e and then written to the memory 30c. The identification information written on the memory 30c is output to the user-end communication terminal connected to the interface 30b, and also supplied to the display unit 30h. On a display unit 30 screen, a character corresponding to the identification information is displayed.

If a card recorded with identification information having a category code 1 representing "horror" and a category code 2 representing a "skull" is inserted in card slot 30f, this identification information is stored to the memory 30c and a character "skull" is displayed on the display 30h. If this card is removed from the card slot 30f and then another card recorded with identification information having a category code 1 representing "animation" and a category code 2 representing a "river horse is inserted therein, the identification information stored on the memory 30c is renewed by the identification information recorded on this other card. Further, the character to be displayed on the display changes from a "skull" to a "river horse".

When new identification information is transmitted from the host-end communication terminal due to telephone communication for a predetermined time period or longer, the identification information on the memory 30c is renewed by the new identification information and the character to be displayed on the display 30h is changed. Furthermore, the new identification information is written onto the card by the card reader/writer 30e. Specifically, an identifier recorded on the card is renewed by the new identification information.

Figure 24:
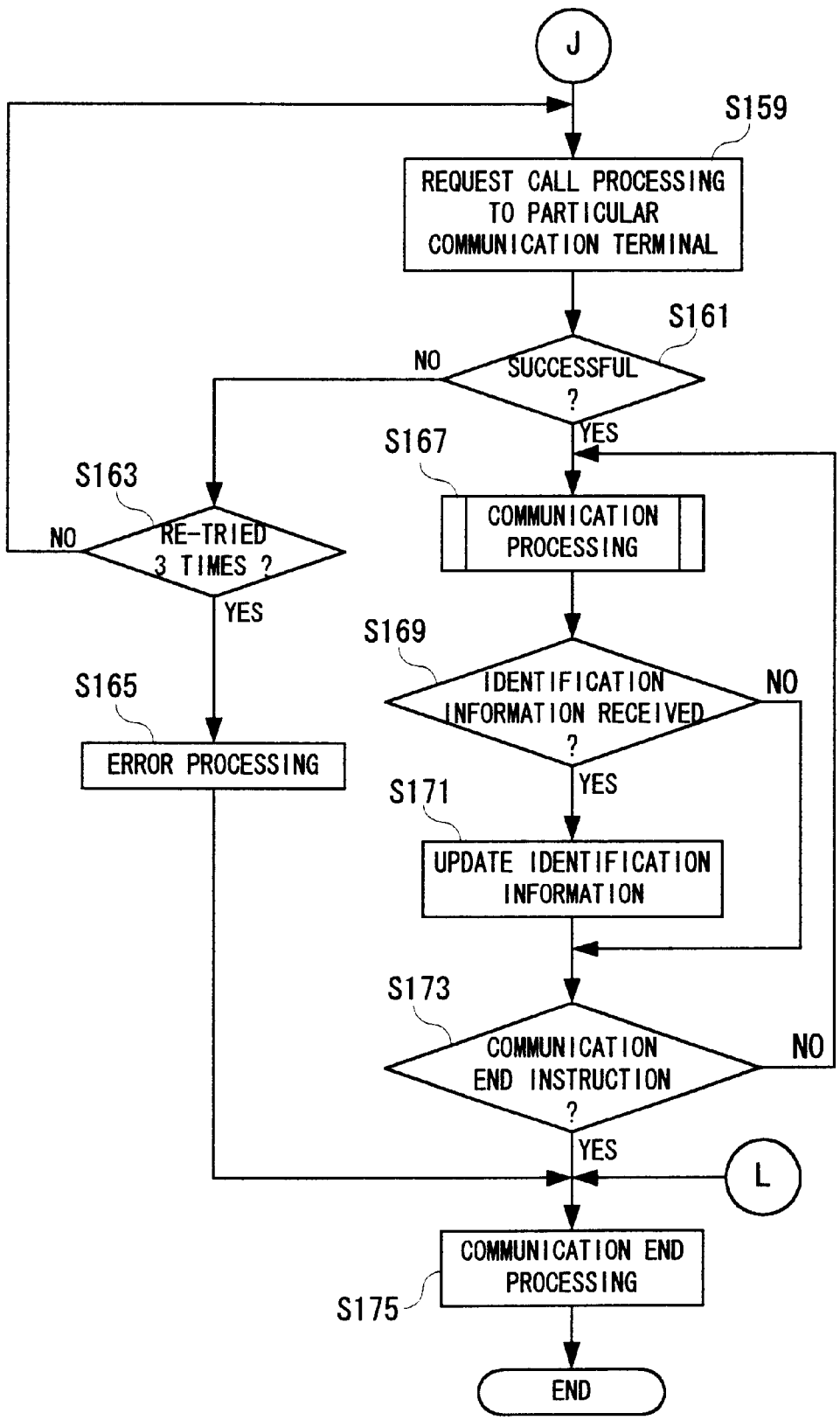
FIG. 24 is a flowchart showing a continuation of the flowchart shown in FIG. 23.
Figure 25:
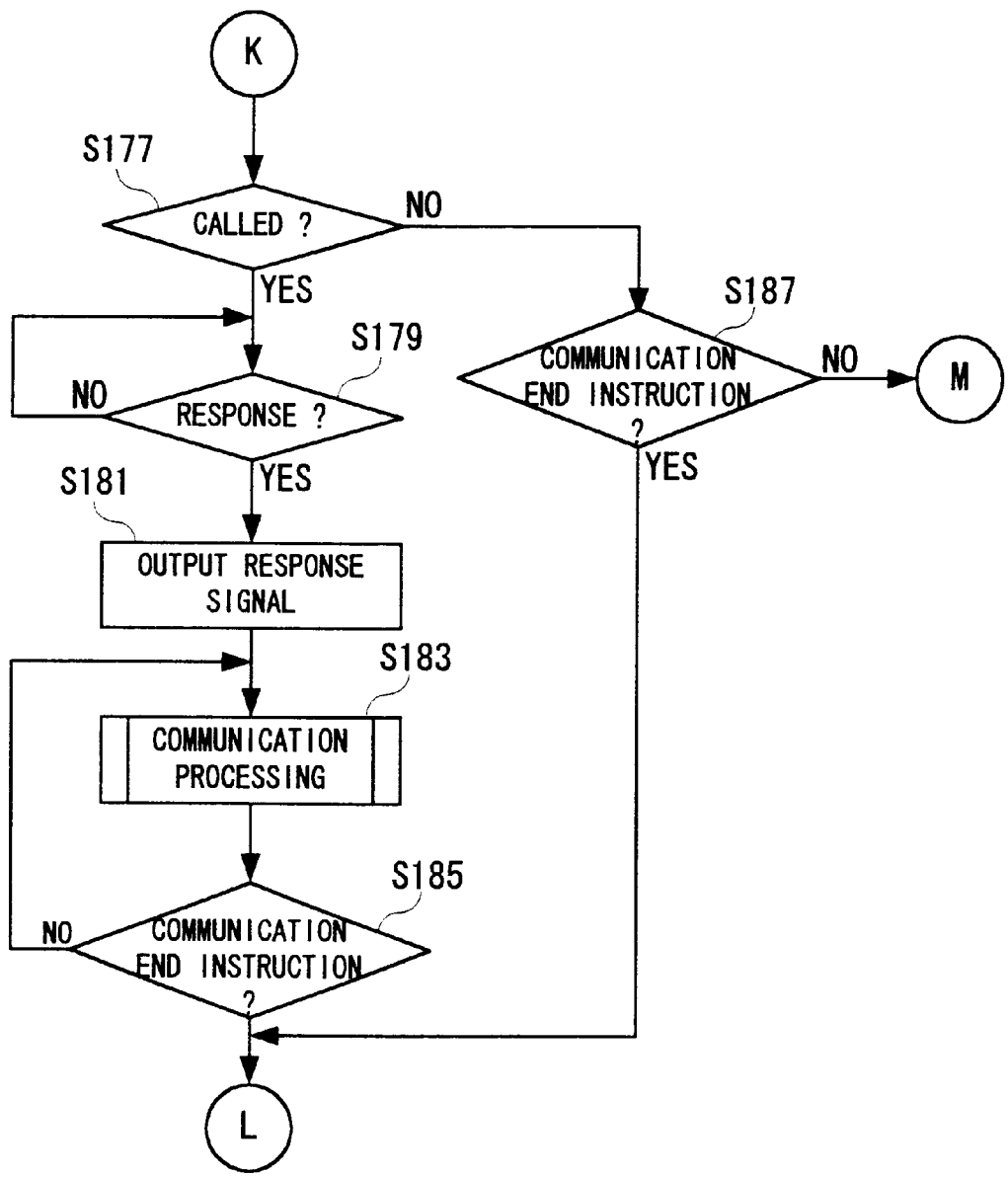
FIG. 25 is a flowchart showing a continuation part of the flowchart shown in FIG. 23.

In a communication service system in another embodiment, user-end communication terminal, host-end communication terminal and a reflector server are connected therebetween through the Internet in a form shown in FIG. 1. Further, the user-end communication terminal, the host-end communication terminals and the reflector server are configured as were shown in FIG. 4 to FIG. 6, wherein the host-end communication terminal processes a flowchart shown in FIG. 15. However, the user-end communication terminal processes flowcharts shown in FIG. 23 to FIG. 25 and the reflector server processes flowcharts shown in FIG. 26 and FIG. 27. That is, the communication service system of this embodiment is similar to the FIG. 1 embodiment, except for the flowcharts processed by the user-end communication terminal and the reflector server.

Figure 23:
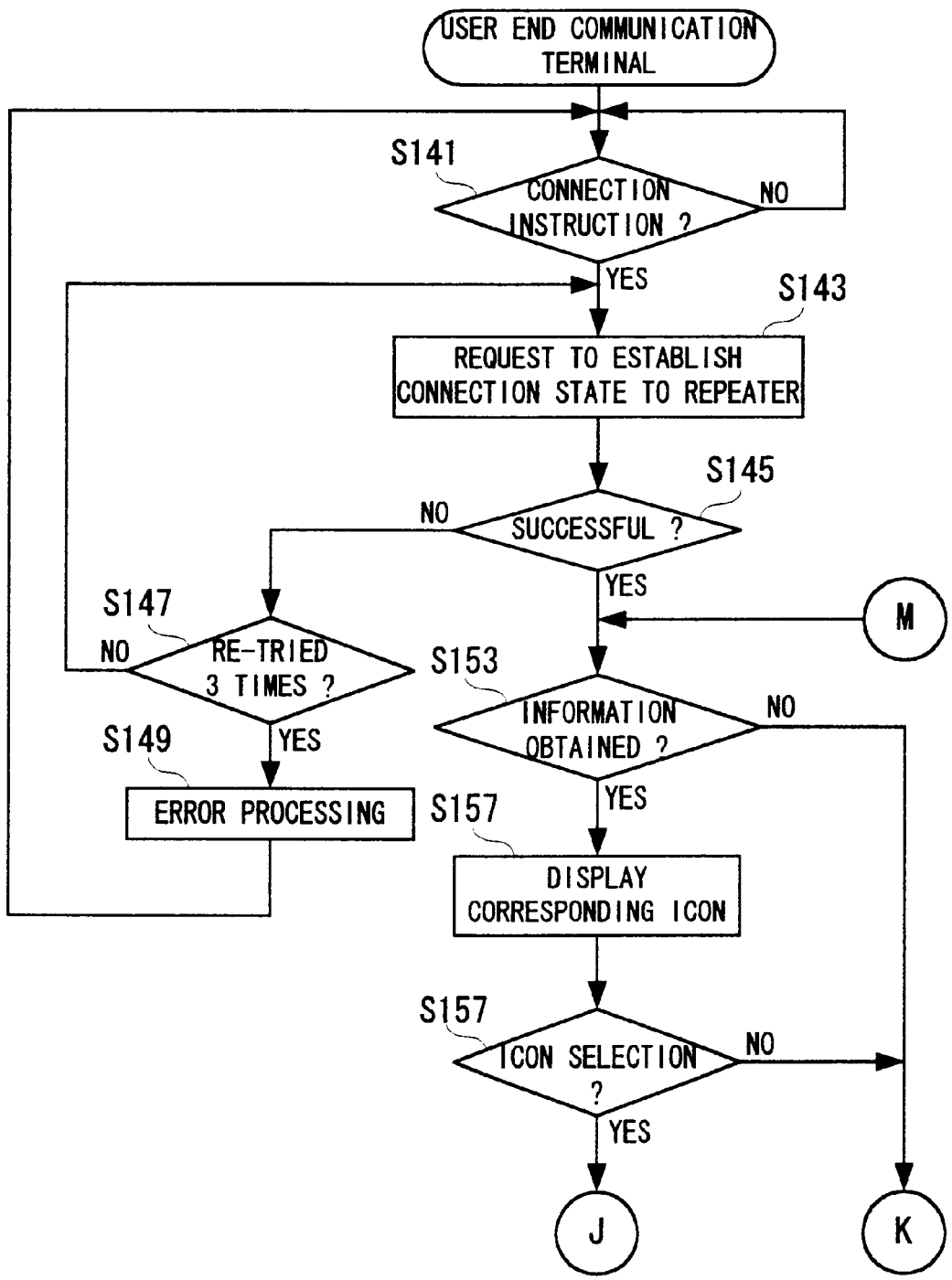
FIG. 23 is a flowchart showing one part of an operation of a user-end communication terminal applied to another embodiment.

Referring first to FIG. 23, the CPU provided on the user-end communication terminal determines, in step S141, whether a connection instruction was given by an operator (user) or not. If a "YES" is indicated here, the CPU advances to step S143 where it outputs a connection establishing a request together with its own communication terminal information to the reflector server. It is determined in step S145 whether a connection state was successfully established or not. If a "NO" is indicated here, it is determined in step S147 whether establishing an connection state was tried 3 times or not. If a "NO" results, the process returns to the step S143, while if "YES", an error process is performed in step S149 and the process returns to the step S141. Incidentally, in the step S143, communication terminal information is also output to the reflector server.

On the other hand, if a "YES" is indicated in the step S145, the process advances to step S153 to determine whether communication terminal information was acquired from the reflector server or not. In this embodiment, the reflector server detects a particular communication terminal information (communication terminal information possessing common identification information) based on the communication terminal information received together with a connection request, and transmits particular communication terminal information, thus detected, to a request-source communication terminal. Due to this, in the step S153 a "YES" is determined where particular communication terminal information was received, but a "NO" is determined when nothing was received. If "YES" is determined in the step S153, the CPU advances to step S155 to display a corresponding icon on the display. If the identification information possessed by its own includes a category code 1 representing "horror" and a category code representing a "skull", a character "skull" will be displayed on the display.

In step S157 it is determined whether this icon was clicked by the user or not. If a "YES" is determined here, the CPU, in step S159, requests the reflector server to perform a call process to the particular communication terminal, and then advances to step S161. In the step S161, whether a connection to a particular communication terminal was successfully made or not is determined by the presence or absence of a response signal. If the connection was failed, the CPU in step S163 determines whether a call process request was tried 3 times or not. If a "NO" results, the process returns to the step S159, while if a "YES" results, the process advances to step S175 through an error process in step S165.

Where a connection to the particular communication terminal is successfully made, the CPU in step S167 communicates with the particular communication terminal. Further, in step S169 it is determined whether new identification information was received from the particular communication terminal or not. If a "NO" results here, the process advances to step S173, while if a "YES" results, the process advances to step S173 after updating the present identification information by new identification information in step S171. In the step S173 it is determined whether or not a communication and instruction was received from the user or host. If a "NO" is indicated, the process returns to the step S167, while if a "YES" is indicated, the process advances to the step S175 to end the process after performing a communication end process.

If a "NO" is determined in the step S153 or S157, the CPU in step S177 determines whether there was a call or not. This call is one that is based on calling from a communication terminal possessing common identification information to that of the terminal. The reflector server detects particular communication terminal information, on each communication terminal basis, from those of communication terminal information registered in the work memory, and distributes detected particular communication terminal information to respective communication terminals. Due to this, the call process requests that the reflector server receives from the respective communication terminals are limited to those to the particular communication terminal. Accordingly, if there is a call determined in the step S177, this call is from the particular communication terminal.

If the user responds to this call, the CPU determines a "YES" result in step S179. The CPU then outputs in step S181 a response signal to the reflector server, and in step S183 performs a communication process with a call-source particular communication terminal. Unless a communication end instruction is given by any of the operators on the other side and this side, the CPU repeats the step S183. However, if a communication end instruction is given from any of them, the CPU advances from the step S185 to step S175. If the user inputs a communication and instruction in a state that the reflector server is connected but no communication is being made with the communication terminal (standby state), the CPU in step S187 determines a "YES" result, and advances to the step S175.

Incidentally, the host-end communication terminal does not make a call. As a result, there is no necessity to provide a process to receive new identification information between the steps S183 and S185.

Figure 26:
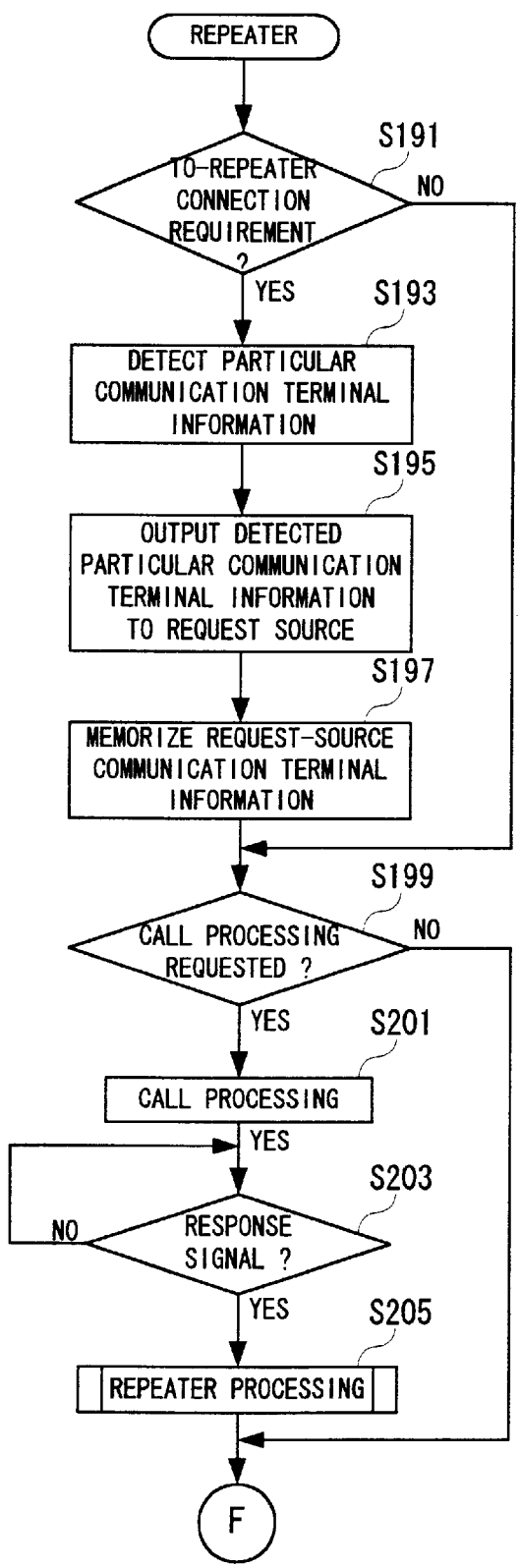
FIG. 26 is a flowchart showing one part of an operation of the reflector server applied to another embodiment.
Figure 27:
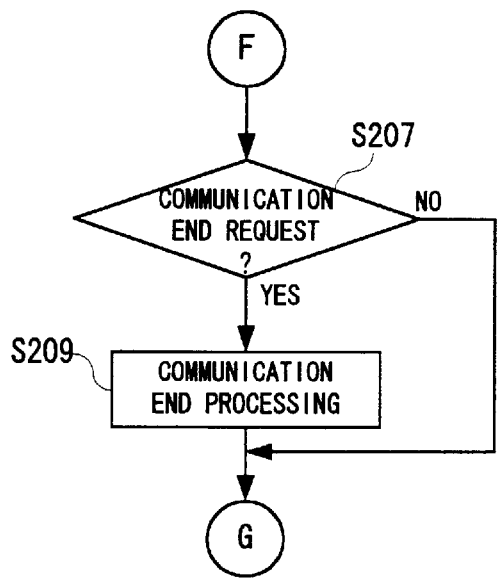
FIG. 27 is a flowchart showing a continuing part of the flowchart shown in FIG. 26.

Referring to FIG. 26, the CPU provided on the reflector server, in step S191, first determines whether a connection establishing request was given from the communication terminal. If there is an establishing request, the CPU advances to step S193 to detect a particular communication terminal information possessing the same identification information as that of a request-source communication terminal. Further, in step S195 this particular communication terminal information is transmitted together with an approval signal to the request-source communication terminal. In step S197, the request-source communication terminal information is written in the work memory.

In the succeeding step S199, it is determined whether a call process request was given from the communication terminal or not. If there is a call process request, the CPU in step S201 performs a call process to the request-source communication terminal. Further, in step S203 it is determined whether the request-source communication terminal responded to this call or not. Receiving a response signal, the CPU in the step S203 determines a "YES" result, and in step S205 performs relaying between the request-source communication terminal and the request-destination communication terminal. In step S207, it is determined whether a communication end request (end signal) was given from the communication terminal. If there is a communication end request, a communication end process is performed in step S209.

In this manner, the reflector server, which received a connection establishing request from the communication terminal, detects a particular communication terminal information from among the communication terminal information held by the work memory, and transmits detected particular communication terminal information to the request-source communication terminal. Due to this, the respective communication terminal are not required to detect particular communication terminal information by themselves.

Incidentally, the host-end communication terminal performs a similar process to that of a FIG. 1 embodiment. This is because the host-end makes communication only passively and is not required to grasps a particular communication terminal.

In these embodiments, the communication terminals in a standby state and includes a particular communication terminal having the same identification information as that possessed by the own terminal, a predetermined icon is displayed on the display. Due to this, the operator can readily find a particular person on opposite side or communication. Also, where the particular communication terminal is a host-end communication terminal, identification information is updated depending upon a duration of communication. Due to this, it is possible to enjoy a telephone speech with a different host with ease.

Figure 28:
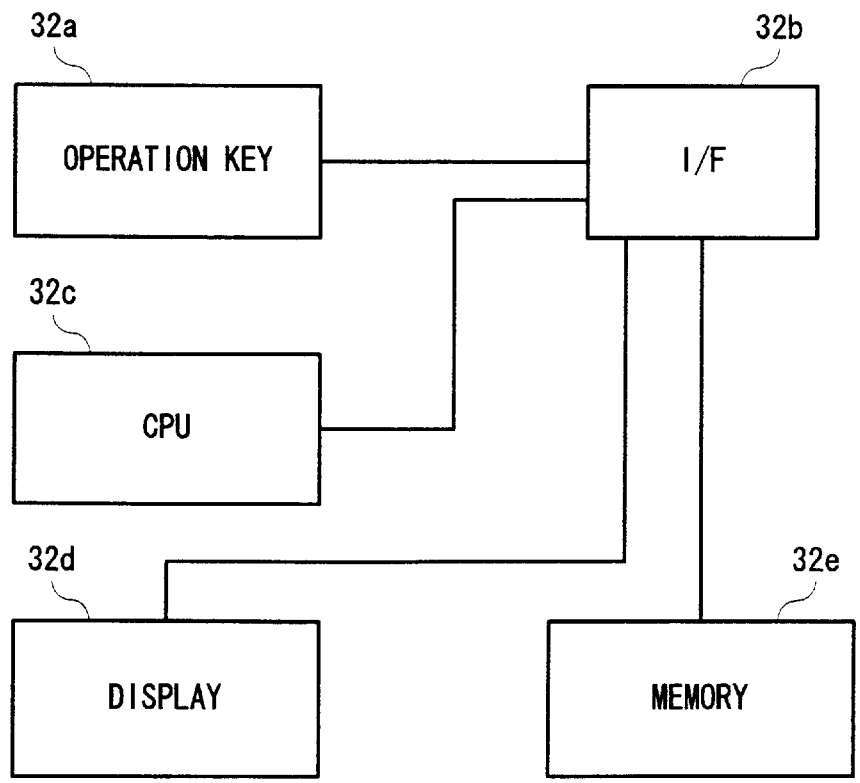
FIG. 28 is a block diagram showing another example of a peripheral equipment to be connected to the communication terminal.

In the above embodiments, explanations were made on the case that the user enjoys a telephone speech with the host or another user. However, this invention is applicable also to a case that the user enjoys a game with the host. In such a case, it can be considered that a game apparatus 32 as shown in FIG. 28 be prepared as a peripheral equipment to be connected to the user-end communication terminal wherein the identification information assigned to each game machine and host-end communication terminal is provided by such category codes as shown in FIG. 29.

In further detail, the game machine 32 includes an operation key 32a connected to the interface 32b. The interface 32b is connected with, besides the operation key 32a, a CPU 32c, a display 32d and a memory 32e. The memory 32e is stored with identification information. The user-end communication terminal is connected to a particular communication terminal through the reflector server, in the similar procedure to the above. Thereupon, the particular communication terminal downloads a predetermined game program to the user-end communication terminal. The downloaded game program is written to the memory 32e. If the operator starts up the game program through the operation key, this program is processed by the CPU 32c. The display 32d display thereon game scenes so that the operator can enjoy the game through using the operation key 32a.

Further, if the operator clears a predetermined condition, new identification information is downloaded through the host-end communication terminal. The current identification information written on the memory 32e is updated by this new identification information. Due to this, when the user enjoys a next game", the user-end communication terminal will access another host-end communication terminal. As a result, a new game program will be downloaded.

Referring to FIG. 29, the memory 32e is first stored by identification information including a category code 1 representing a "competition game", a category code 2 representing "Sumo wrestling" and a category code 3 representing "lowest level". Due to this, a game program having a "lowest level" Sumo wrestler as a competition competitor is first downloaded through the host-end communication terminal. If the operator defeats this Sumo wrestler, the identification information having a category code 3 changed from "lowest level" to "second lowest level" is transmitted from the host-end communication terminal. This enables the user-end communication terminal to access another host-end communication terminal. This other host-end comminucation terminal has a game program having a "second lowest level" Sumo wrestler as a competition competitor, and the game program like this is downloaded to the access source.

In the communication service system using a game apparatus as above, when the game is cleared, new identification information is transmitted from the host-end. Consequently, if games corresponding to respective ones of identification information are prepared on the host-end, the user is allowed to promptly acquire a new game each time the game is cleared.

Incidentally, although in the above embodiments the communication between communication terminals is implemented through the Internet, the network to be used for communication may be the Intranet or RAN (Local Area Network).

Also, although in FIG. 2 the camera head of the mike-integrated camera wore a character doll corresponding to the identification information, it is possible to readily recognize the content of the identification information even where the character is represented by a photograph, painting picture, characters or sound, in place of the doll. Meanwhile, in any of the mike-integrated camera shown in FIG. 2 and FIG. 21, a desk top is formed to be placed on a table, clips may be provided on the mike-integrated camera so that the mike-integrated camera can be mounted at a periphery of a liquid crystal display through the clips.

Further, the user-end communication control program may be offered to the user by marketing a CD-ROM recorded with such a program, together with peripheral equipment such as the mike-integrated camera, or by downloading the program from the host-end communication terminal to the user-end communication terminal. Furthermore, such a program may be sold by pre-installing a communication terminal.

Also, in the above embodiment the new identification information was held by the host-end communication terminal and outputted from the host-end communication terminal when a predetermined condition is satisfied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal for implementing communication through a repeater, comprising:
    a memory holding an identifier;
    an establishing means for establishing a connection state to said repeater;
    a receiving means for receiving from said repeater an identifier of another communication terminal connected to said repeater, wherein a plurality of identifiers is received by the receiving means over a period of time;
    a search means for searching for a particular identifier associated with said identifier held in said memory from among the plurality of identifiers received by said receiving means; and
    a display means for displaying a predetermined character depending upon a result of search by said search means.

2. A communication terminal according to claim 1, wherein said establishing means further comprises:
    a transmitting means for transmitting a request to establish said connection state together with said identifier held in said memory to said repeater.

3. A communication terminal according to claim 1, further comprising
    an accepting means for accepting a communication start instruction;
    a request means for requesting said repeater to start communications with a particular communication terminal corresponding to said identifier in response to said communication start instruction; and
    a communication processing means for performing communication processing with said particular communication terminal.

4. A communication terminal according to claim 3, wherein
    said communication start instruction is a select character.

5. A communication terminal according to claim 3, further comprising
    a second receiving means of said plurality of receiving means for receiving a new identifier transmitted from said particular communication terminal; and
    a write means for writing said new identifier to said memory.

6. A communication terminal according to claim 5, wherein
    said write means updates said identifier held in said memory by said new identifier.

7. A communication terminal according to claim 5, wherein
    said predetermined character possesses a shape corresponding to said identifier held in said memory.

8. A communication terminal according to claim 3, further comprising
    a mike for performing sound communication with said communication terminal.

9. A communication terminal according to claim 3, further comprising a camera for performing image communication with said communication terminal.

10. A communication terminal for implementing communication through a repeater, comprising:
   a memory for holding an identifier;
   an establishing means for transmitting said identifier to said repeater and establishing a state of connection to said repeater;
   a receiving means for receiving through said repeater a communication start request transmitted from another communication terminal;
   a communication processing means for performing communication processing with another communication terminal in response to said communication start request; and
   a transmitting means for transmitting a new identifier different from said identifier to said another communication terminal when a predetermined relation is established to said another communication terminal.

11. A communication terminal according to claim 10, wherein
   said identifier includes at least two category codes, wherein one of said category codes representing a category including a category represented by the other category code.

12. A communication terminal according to claim 11, wherein
   said identifier held in said memory is different from said new identifier at least in category code representative of a minimal category.

13. A computer readable recording medium for recording a program to be executed by a communication terminal for implementing communication through a repeater, said program comprising:
   an establishing step for establishing a connection state with said repeater;
   a first receiving step of a plurality of receiving steps for receiving from said repeater an identifier of another communication terminal connected to said repeater, wherein a plurality of identifiers is received by the plurality of receiving steps over a period of time;
   a search step for searching for a particular identifier of the plurality of identifiers associated with said identifier held in said memory from among the plurality of identifiers received by said first receiving step; and
   a display step for displaying a predetermined character depending upon a result of search by said search step.

14. A recording medium according to claim 13, wherein said establishing step, further comprises:
   a transmitting step for transmitting to said repeater a request to establish said connection state together with said identifier held in said memory.

15. A recording medium according to claim 13, said program further comprising:
   an accepting step for accepting a communication start instruction;
   a request step for requesting said repeater to start communication with a particular communication terminal corresponding to said particular identifier in response to said communication start instruction; and
   a communication processing step for performing communication processing with said particular communication terminal.

16. A recording medium according to claim 15, said program further comprising a second receiving step for receiving a new identifier transmitted from said particular communication terminal; and
   a write step for writing said new identifier to said memory.

17. A recording medium according to claim 16, wherein
   said write step updates said identifier held in said memory by said new identifier.

18. A communication terminal for implementing communication through a repeater, comprising:
   a memory for holding an identifier;
   an establishing means for establishing a connection state to said repeater;
   a first transmitting means for transmitting to said repeater said identifier held in said memory;
   a first receiving means for receiving from said repeater a particular identifier associated with said identifier held in said memory; and
   a display means for displaying a predetermined character when said particular identifier is received.

19. A communication terminal according to claim 18, further comprising:
   an accepting means for accepting a communication start instruction;
   a request means for requesting to said repeater to start communication with a particular communication terminal associated with said particular identifier in response to said communication start instruction; and
   a communication processing means for performing communication processing with said particular communication terminal.

20. A communication terminal according to claim 19, wherein
   said communication start instruction selects said predetermined character.

21. A communication terminal according to claim 19, further comprising:
   a second receiving means for receiving a new identifier transmitted from said particular communication terminal; and
   a write means for writing said identifier to said memory.

22. A communication terminal according to claim 21, wherein
   said write means includes an update means for updating said identifier held in said memory by said new identifier.

23. A communication terminal according to claim 19, further comprising:
   a mike for performing sound communication with said particular communication terminal.

24. A communication terminal according to claim 19, further comprising:
   a camera for performing image communication with said particular communication terminal.

25. A repeater for repeating communication, comprising:
   an establishing means for establishing a connection state to a communication terminal;
   a memory for holding an identifier of a communication terminal established in said connection state;
   a detecting means for detecting a particular identifier associated with an identifier to be identified from among a plurality of identifiers held in said memory;
   a transmitting means for transmitting said particular identifier to a communication terminal having said identifier to be identified; and a repeater processing means for relay processing with a particular communication terminal having said particular identifier in response to a communication start request from said communication terminal having said identifier to be identified.

26. A repeater according to claim 25, wherein said detecting means detects said particular identifier from among identifiers for communication terminals which are established in said connection state but being out of communication.

27. A computer-readable recording medium for recording a program to be executed by a communication terminal to implement communication through a repeater, said program comprising:

an establishing step for establishing a state of connection to said repeater;

a first transmitting step for transmitting an identifier held in a memory to said repeater;

a first receiving step for receiving from said repeater a particular identifier associated with said identifier held in said memory; and a display step for displaying a predetermined character when said particular identifier is received.

28. A recording medium according to claim 27, said program further comprising:

an accepting step for accepting a communication start instruction;

a request step for requesting to said repeater to start communication with a particular communication terminal having said particular identifier in response to said communication start instruction; and a communication processing step for performing communication processing with said particular communication terminal.

29. A recording medium according to claim 28, further comprising:

a second receiving step for receiving new identifier transmitted from said particular communication terminal; and a write step for writing said new identifier to said memory.

30. A recording medium according to claim 29, wherein said write step includes an update step for updating said identifier held in said memory by said new identifier.

31. A peripheral equipment to be used together with a communication terminal for implementing communication through a repeater, comprising:

a memory for holding an identifier associated with a particular communication terminal;

an input means for inputting information;

an interface for providing said identifier and said information to said communication terminal;

an intake means for intaking a cartridge recorded with an identifier;

a read means for reading out said identifier recorded on said cartridge; and an update means for updating said identifier held in said memory by said identifier read out by said read means.

32. A peripheral equipment according to claim 31, further comprising a write means for writing said identifier held in said memory to said cartridge.

33. A peripheral equipment according to claim 32, wherein said write means includes an update means for updating said identifier recorded on said cartridge by said identifier held in said memory.

* * * * *